United States Patent
Cho et al.

(10) Patent No.: US 12,107,268 B2
(45) Date of Patent: Oct. 1, 2024

(54) COMPOSITE POSITIVE ELECTRODE ACTIVE MATERIAL FOR LITHIUM SECONDARY BATTERY, PREPARATION METHOD THEREOF, AND LITHIUM SECONDARY BATTERY INCLUDING POSITIVE ELECTRODE INCLUDING THE SAME

(71) Applicants: Samsung SDI Co., Ltd., Yongin-si (KR); UNIST(ULSAN NATIONAL INSTITUTE OF SCIENCE AND TECHNOLOGY), Ulsan (KR)

(72) Inventors: Kwanghwan Cho, Yongin-si (KR); Moonsu Yoon, Ulsan (KR); Jaephil Cho, Ulsan (KR)

(73) Assignees: SAMSUNG SDI CO., LTD., Yongin-si (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 470 days.

(21) Appl. No.: 17/192,711

(22) Filed: Mar. 4, 2021

(65) Prior Publication Data

US 2021/0280866 A1    Sep. 9, 2021

(30) Foreign Application Priority Data

Mar. 5, 2020  (KR) ......................... 10-2020-0027983

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/04* (2013.01); *H01M 4/505* (2013.01);
(Continued)

(58) Field of Classification Search
CPC .............................. H01M 4/525; H01M 4/366
See application file for complete search history.

(56) References Cited

U.S. PATENT DOCUMENTS

| 7,316,865 B2 | 1/2008 | Kweon et al. |
| 10,797,317 B2 | 10/2020 | Cho |

(Continued)

FOREIGN PATENT DOCUMENTS

| CN | 1466235 A | 1/2004 |
| CN | 2014-10328214 | 11/2014 |

(Continued)

OTHER PUBLICATIONS

Zhang et al., Nov. 29, 2019, Surface-Coated $LiNi_{0.8}Co_{0.1}Mn_{0.1}O_2$ (NCM811) Cathode Materials by $Al_2O_3$, $ZrO_2$, and $Li_2O$—$2B_2O_3$ Thin-Layers for Improving the Performance of Lithium Ion Batteries, Frontiers in Materials, 6:309, 2019.

(Continued)

*Primary Examiner* — Nathanael T Zemui
(74) *Attorney, Agent, or Firm* — Knobbe, Martens, Olson & Bear, LLP

(57) ABSTRACT

This application relates to a composite positive electrode active material for a lithium secondary battery. The composite positive electrode active material includes a nickel-based active material and a cobalt-boron compound-containing coating layer formed on a surface of the nickel-based active material. The application also relates to a method of preparation of the composite positive electrode active material. The application further relates to a lithium secondary battery including a positive electrode containing the composite positive electrode active material.

18 Claims, 40 Drawing Sheets

(51) Int. Cl.
  *H01M 4/02* (2006.01)
  *H01M 4/04* (2006.01)
  *H01M 4/505* (2010.01)
  *H01M 10/0525* (2010.01)

(52) U.S. Cl.
  CPC ..... *H01M 10/0525* (2013.01); *C01P 2002/72* (2013.01); *C01P 2002/74* (2013.01); *C01P 2004/03* (2013.01); *C01P 2004/04* (2013.01); *C01P 2004/24* (2013.01); *C01P 2004/64* (2013.01); *C01P 2004/80* (2013.01); *C01P 2006/40* (2013.01); *H01M 2004/028* (2013.01)

(56) References Cited

U.S. PATENT DOCUMENTS

| | | | | |
|---|---|---|---|---|
| 2003/0073004 | A1* | 4/2003 | Kweon | H01M 4/366 429/231.95 |
| 2013/0092674 | A1 | 4/2013 | Gerth | |
| 2015/0021518 | A1* | 1/2015 | Kokado | C01G 53/50 252/182.1 |
| 2016/0301063 | A1* | 10/2016 | Yukinobu | H01M 4/049 |
| 2017/0263920 | A1 | 9/2017 | Choi | |
| 2019/0393502 | A1* | 12/2019 | Yun | H01M 4/505 |
| 2020/0343553 | A1 | 10/2020 | Kim et al. | |
| 2021/0036318 | A1* | 2/2021 | Kim | C01G 53/42 |

FOREIGN PATENT DOCUMENTS

| | | |
|---|---|---|
| CN | 108550802 A | 9/2018 |
| CN | 110459736 A | 11/2019 |
| JP | WO2015/186321 A1 | 12/2015 |
| KR | 10-0382305 B1 | 4/2003 |
| KR | 2015-0095814 A | 8/2015 |
| KR | 10-1747140 B1 | 3/2016 |
| KR | 2018-0077090 A | 7/2018 |
| KR | 10-2019-0041420 A | 4/2019 |
| KR | 10-20190079526 A | 7/2019 |
| KR | 10-2019-0093547 A | 8/2019 |
| WO | WO 2019/074305 | 4/2019 |
| WO | WO 2019/164313 | 8/2019 |

OTHER PUBLICATIONS

Extended European Search Report dated Jul. 26, 2021 in corresponding to European Patent Application No. 21161111.6, 7 pp.
Office Action dated Oct. 12, 2021 in corresponding Korean Patent Application No. 10-2020-0027983, 7 pp.
Notice of reasons for refusal dated Feb. 7, 2022 in corresponding Japanese patent application No. 2021-035263, 4 pp.
Sabarou et al., Manipulating the structure and morphology of Cobalt-Boron nano-particles through a chemical approach, vol. 829, pp. 762-766, 2014.
Notification of first office action issued Jan. 3, 2024 in corresponding Chinese patent application No., 202110244070.1.

* cited by examiner

Co K series

100nm

O K series

100nm

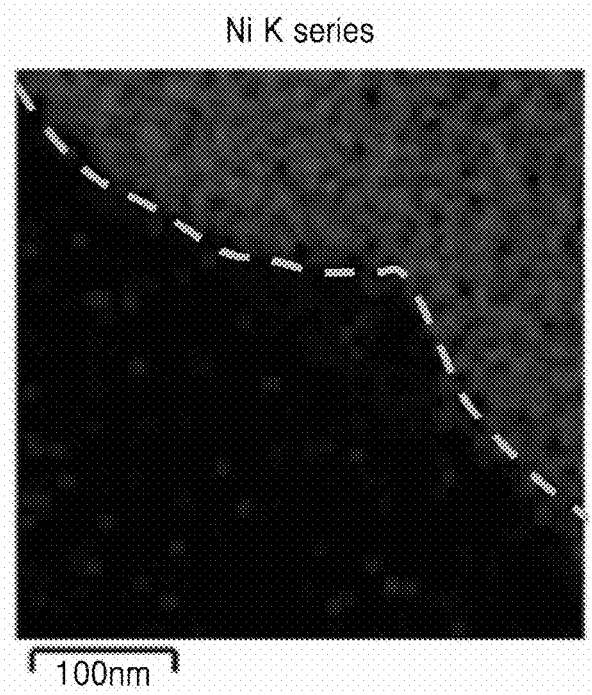

COMPOSITE POSITIVE ELECTRODE ACTIVE MATERIAL FOR LITHIUM SECONDARY BATTERY, PREPARATION METHOD THEREOF, AND LITHIUM SECONDARY BATTERY INCLUDING POSITIVE ELECTRODE INCLUDING THE SAME

CROSS-REFERENCE TO RELATED APPLICATION

This application is based on and claims priority under 35 U.S.C. § 119 to Korean Patent Application No. 10-2020-0027983, filed on Mar. 5, 2020, in the Korean Intellectual Property Office, the disclosure of which is incorporated by reference herein in its entirety.

BACKGROUND

1. Field

One or more embodiments relate to a composite positive electrode active material, a preparation method thereof, and a lithium secondary battery including a positive electrode including the same.

2. Description of Related Technology

With the advance of portable electronic devices and communication devices, the need for development of lithium secondary batteries having high energy density is high. A lithium secondary battery is a storage system capable of repetitive charging and discharging, which is used as a charge carrier of lithium ions, and includes an ion exchange film, a positive electrode, a negative electrode, and an electrolyte.

A nickel-based active material is used as a positive electrode active material for the lithium secondary battery. The performance of a nickel-based active material may be deteriorated due to growth between particles and side reactions with an electrolyte during the charging and discharging process. Thus, improvements are required to avoid deterioration and side reactions in the active materials used in positive electrode active material.

SUMMARY

One or more embodiments provide composite positive electrode active materials for lithium secondary batteries having improved phase stability by suppressing the formation of micro-cracks that occur after charging and discharging.

One or more embodiments provide methods of preparing the composite positive electrode active materials for the lithium secondary batteries.

One or more embodiments provide lithium secondary batteries including positive electrodes including the composite positive electrode active materials for the lithium secondary batteries to have improved efficiency and lifetime.

Additional aspects will be set forth in part in the description which follows and, in part, will be apparent from the description, or may be learned by practice of the presented embodiments of the disclosure.

According to one or more embodiments, a composite positive electrode active material for a lithium secondary battery includes, for example, a nickel-based active material; and a cobalt-boron compound-containing coating layer formed on a surface of the nickel-based active material.

According to one or more embodiments, a lithium secondary battery includes: a positive electrode including the aforementioned composite positive electrode active material; a negative electrode; and an electrolyte between the positive electrode and the negative electrode.

According to one or more embodiments, a method of preparing a composite positive electrode active material for a lithium secondary battery includes: mixing a nickel-based active material, a cobalt precursor, and a first solvent to prepare a mixture; and adding a boron reducing agent and a second solvent to the mixture and performing a reaction at room temperature under an inert gas atmosphere.

According to one or more embodiments, a composite positive electrode active material for a lithium secondary battery comprises a nickel-based active material and a cobalt-boron compound-containing coating layer formed on a surface of the nickel-based active material.

According to one or more embodiments of the composite positive electrode active material, the cobalt-boron compound-containing coating layer comprises an amorphous cobalt-boron compound. The cobalt-boron compound-containing coating layer includes comprises a compound represented by Formula 1:

$$Co_xB_y \quad \text{[Formula 1]}$$

wherein x is a number of 1 to 3, and y is a number of 0.05 to 3.

According to one or more embodiments of the composite positive electrode active material, the nickel-based active material comprises secondary particles. The secondary particles comprise aggregates of primary particles. The cobalt-boron compound-containing coating layer is present within voids of between the secondary particles.

According to one or more embodiments of the composite positive electrode active material, the content of the cobalt-boron compound is about 0.001 parts by weight to about 10 parts by weight based on about 100 parts by weight of the nickel-based active material.

According to one or more embodiments of the composite positive electrode active material, the nickel-based active material comprises a compound represented by Formula 2:

$$Li_a(Ni_{1-x-y-z}Co_xM_yM'_z)O_{2-\delta} \quad \text{[Formula 2]}$$

wherein M is at least one element selected from Mn and Al, M' is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), except when M and M' are both aluminium (Al), and $0.95 \leq a \leq 1.3$, $x \leq (1-x-y-z)$, $y \leq (1-x-y-z)$, $z \leq (1-x-y-z)$, $0<x<1$, $0 \leq y<1$, $0 \leq z<1$, and $1.98 \leq 2-0 \leq 2$ are satisfied.

According to one or more embodiments of the composite positive electrode active material, in an X-ray photoelectron spectroscopy of the composite positive active material, a first peak corresponding to Co 2p1/2 appears at a binding energy of 793 eV to 796 eV, and a second peak corresponding to Co 2p3/2 appears at a binding energy of 778 eV to 781 eV, wherein the intensity ratio of the first peak and the second peak is about 1:1.18 to about 1:1.26.

According to one or more embodiments of the composite positive electrode active material, the oxidation number of cobalt in the cobalt-boron compound-containing coating layer is +2+α (−1<α<1). The cobalt-boron compound has a nanoflake shape. The composite positive electrode active material comprises mesopores having an average diameter of about 10 nm to about 30 nm. The cobalt-boron compound-containing coating layer has a thickness of about 100 nm or less. The cobalt-boron compound-containing coating layer comprises uniformly-distributed mesopores configured for ion transfer at an interface between the positive electrode active material and the electrolyte.

According to one or more embodiments, a lithium secondary battery comprises a positive electrode including the composite positive electrode active material according to one or more embodiments herein, a negative electrode, and an electrolyte interposed between the positive electrode and the negative electrode.

According to one or more embodiments of the lithium secondary battery, the cobalt-boron compound-containing coating layer of the composite positive electrode active material comprises a compound represented by Formula 1:

$$Co_xB_y,$$ [Formula 1]

wherein x is a number of 1 to 3, and y is a number of 0.05 to 3, and the cobalt-boron compound-containing coating layer is present within voids between the secondary particles.

According to one or more embodiments, a method of preparing a composite positive electrode active material for a lithium secondary battery comprises mixing a nickel-based active material, a cobalt precursor, and a first solvent to prepare a mixture, adding a boron reducing agent and a second solvent to the mixture, and performing a reaction at room temperature under an inert gas atmosphere.

According to one or more embodiments of the method of preparing a composite positive electrode active material for a lithium secondary battery, the boron reducing agent is selected from sodium borohydride ($NaBH_4$), sodium cyanoborohydride ($NaCNBH_3$), sodium acetoxyborohydride ($NaBH_3OAc$), or a mixture thereof. The cobalt precursor is selected from cobalt chloride, cobalt nitrate, cobalt sulfate, cobalt oxide, cobalt carbonate, cobalt citrate, cobalt acetate, or a combination thereof. The nickel-based active material is a compound represented by Formula 2-1:

$$Li_a(Ni_{1-x-y-z}Co_xMn_yM'_z)O_{2-\delta}$$ [Formula 2-1]

wherein M' is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and $0.95 \le a \le 1.3$, $x \le (1-x-y-z)$, $y \le (1-x-y-z)$, $z \le (1-x-y-z)$, $0 < x < 1$, $0 \le y < 1$, $0 \le z < 1$, and $1.998 \le 2-\delta \le 2.000$ are satisfied. The first solvent and the second solvent is distilled water, ethanol, methanol, isopropanol, butanol, pentanol, or a combination thereof.

BRIEF DESCRIPTION OF THE DRAWINGS

The aspects, features, and advantages of certain embodiments of the present disclosure will be more apparent from the following description taken in conjunction with the accompanying drawings, in which:

FIGS. 5A to 5D illustrate embodiments of the TEM-EDX analysis results of the cross-section of the composite positive electrode active material particle in the positive electrode of Example 1 after a cycle characteristic test;

DETAILED DESCRIPTION

Figure 1A:
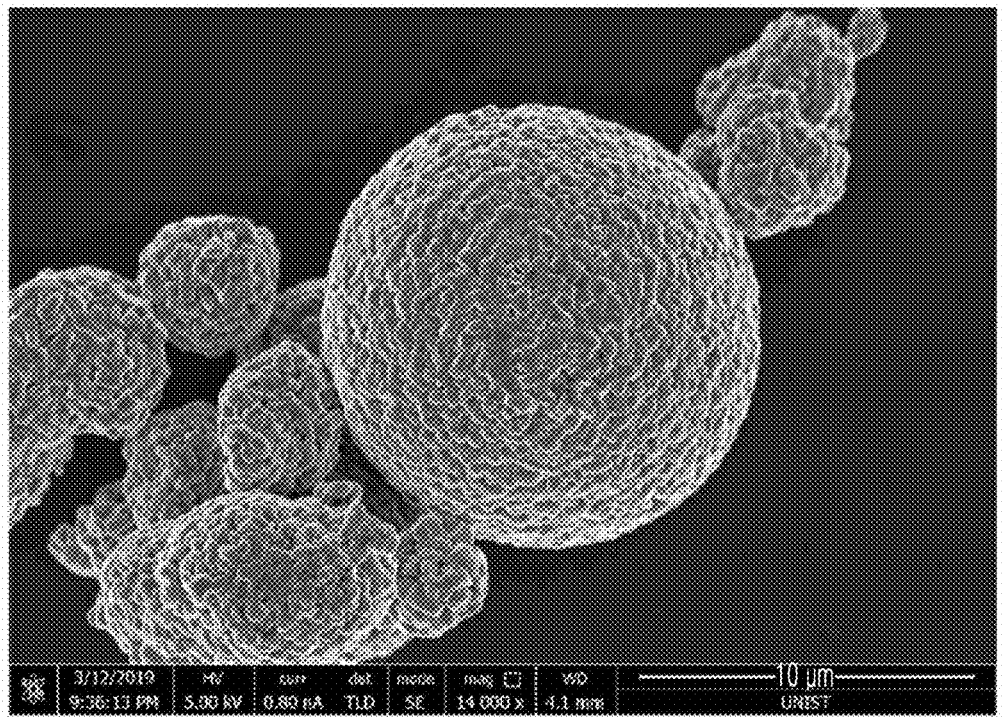
FIGS. 1A and 1B illustrate embodiments of the results of scanning electron microscopy analysis of the nickel-based active material of Comparative Preparation Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Expressions such as "at least one of," when preceding a list of elements, modify the entire list of elements and do not modify the individual elements of the list.

Hereinafter, a composite positive electrode active material for a lithium secondary battery, a method of preparing the same, and a lithium secondary battery having a positive electrode including the same will be described in more detail with reference to the accompanying drawings.

There is provided a composite positive electrode active material for a lithium secondary battery, including: a nickel-based active material; and a cobalt-boron compound-containing coating layer formed on a surface of the nickel-based active material.

The nickel-based active material comprises secondary particles as aggregates of primary particles, and the cobalt-boron compound-containing coating layer exists in voids between the secondary particles. The existence of the coating layer in the voids of the nickel-based active material may be confirmed through TEM-EDX and electron energy loss spectroscopy (EELS).

As a high-capacity positive electrode active material, a nickel-based active material having a high nickel content, for example, a nickel-based active material having a nickel content of 50 mol % or more, 70 mol % or more, 80 mol % or more, or 80 mol % to 90 mol % is used. The above nickel contents are merely examples, and other nickel contents are also possible.

The nickel-based active material may be prepared, for example, by a coprecipitation method. According to this preparation method, nickel as a main component and doping elements such as cobalt (Co), manganese (Mn), and/or aluminum (Al), and zirconium (Zr), titanium (Ti), or magnesium (Mg) may be uniformly distributed. The above doping elements are merely examples, and other doping elements are also possible. The nickel-based active material obtained according to this preparation method is obtained in the form of secondary particles. In the nickel-based active material in the form of secondary particles, during the repetitive charging and discharging processes, micro-cracks or intergranular cracks grow in the secondary particles, and the lifetime of a lithium secondary battery having a positive electrode including the nickel-based active material may be reduced due to a side reaction with an electrolyte. In order to solve this problem, a coating layer was formed on the surface of the nickel-based active material to improve the stability of the surface of the nickel-based active material, but it has not yet reached a satisfactory level.

Thus, the present disclosure is related to a composite positive electrode active material having improved phase stability by stably maintaining not only the surface of the nickel-based active material, but also the voids inside the nickel-based active material.

The composite positive electrode active material according to an embodiment comprises a cobalt-boron compound-containing coating layer on the surface of the nickel-based active material. This coating layer may be contained in the voids between the secondary particles constituting the nickel-based active material. This composite positive electrode active material effectively suppresses the damage of particles under repetitive charge/discharge conditions, which is a problem of a conventional nickel-based active material, minimizes the direct contact area between a positive electrode active material and an electrolyte under high-voltage charge/discharge conditions to reduce the oxidation reaction of the electrolyte and the formation of a positive electrode film, and suppresses the irreversible reduction of transition metals and the deintercalation of oxygen to stably maintain the layered positive electrode active material.

In the composite positive electrode active material according to an embodiment, mesopores are uniformly distributed in the cobalt-boron compound-containing coating layer to enable easy ion transfer at the interface between the positive electrode active material and the electrolyte.

Mesopores have an average pore diameter of 50 nm or less, for example 10 nm to 30 nm. The above pore diameters are merely examples, and other pore diameters are also possible. These mesopores may be checked through BET, SEM, TEM, or the like. According to an embodiment, the mesopores may be uniformly distributed in the coating layer of the composite positive electrode active material.

In general nickel-based active materials, macropores exist in the voids between particles. Here, the macropores have an average diameter of greater than 50 nm. In contrast, since the composite positive electrode active material of the present disclosure contains a cobalt-boron compound-containing coating layer, which is a porous coating layer, unlike a general nickel-based active material, macropores decrease and mesopores increase, so that porosity distribution characteristics change as compared with a conventional nickel-based active material.

Further, the cobalt-boron compound-containing coating layer provides a stable lithium ion transport channel, thereby improving ionic conductivity characteristics. As a result, the formation of micro-cracks occurring during charge/discharge cycles at high voltage, room temperature, and high temperature is suppressed, and thus phase stability is improved, thereby improving lifetime and high-rate characteristics. In the present disclosure, room temperature represent 25° C.

In the present disclosure, the definitions of the terms "inside" and "surface" of the nickel-based active material will be described. The term "inside" refers to an inside based on an area where the volume becomes equal when divided by the same ratio in all directions from the center of the nickel-based active material to the surface thereof. The inside refers to an area of 10 vol % to 90 vol %, for example, 50 vol %, based on the total volume of the nickel-based active material, and the outside refers to a residual area. The above range and area are merely examples, and other ranges and area are also possible. The term "inside" refers to an area of 50 vol % to 70 vol %, for example, 60 vol %, based on the total volume of the nickel-based active material from the center hereof to the surface thereof or an area excluding the area (surface area) within 2 μm from the outermost side of the nickel-based active material in the total distance from the center of a nickel-based active material to the surface thereof.

The above ranges and area are merely examples, and other ranges and area are also possible. According to an embodiment, the inside of the nickel-based active material may be, for example, an area within 100 nm from the surface of the nickel-based active material.

The cobalt-boron compound may be represented by Formula 1.

  [Formula 1]

In some embodiments, in Formula 1, x is a number of 1 to 3, and y is a number of 0.05 to 3.

For example, x is a number of 1 to 2. The compound represented by Formula 1 is, for example, $Co_2B$.

In Formula 1, x/y is 0.5 to 2.5.

The cobalt-boron compound-containing coating layer may include an amorphous cobalt-boron compound. The morphology of the cobalt-boron compound may have a form of nanoflake or cage. This morphology may be confirmed through TEM or the like.

In the composite positive electrode active material according to an embodiment, the content of the cobalt-boron compound is, for example, 0.001 parts by weight to 10 parts by weight, 0.01 parts by weight to 10 parts by weight, 0.05 parts by weight to 8 parts by weight, 0.01 parts by weight to 5 parts by weight, 0.05 parts by weight to 3 parts by weight, 0.05 parts by weight to 1 part by weight, based on 100 parts by weight of the nickel-based active material. The above content of the cobalt-boron compound are merely examples, and other content of the cobalt-boron compound are also possible. When the content of the cobalt-boron compound is within the above range, the effect of improving the phase stability of the composite positive electrode active material is excellent. Here, the content of the cobalt-boron compound may be a sum of the content of the coating layer formed on the surface of the nickel-based active material and the content of the cobalt-boron compound present in inner pores.

The nickel-based active material includes a compound represented by Formula 2.

  [Formula 2]

In some embodiments, in Formula 2, M is at least one element selected from Mn and Al, M' is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), except when M and M' are both aluminium (Al), and 0.95≤a≤1.3, x≤(1-x-y-z), y≤(1-x-y-z), z≤(1-x-y-z), 0<x<1, 0≤y<1, 0≤z<1, and 1.998≤2-δ≤2 are satisfied.

In the nickel-based active material of Formula 2, the content of nickel is greater than the content of cobalt, M and M'.

In some embodiments, in Formula 2, 0.3≤1-x-y-z≤0.99, 0.5<1-x-y-z≤0.99, 0.6<1-x-y-z≤0.99, 0.8≤1-x-y-z≤0.99, and 0.8≤1-x-y-z≤0.95 are satisfied.

The nickel-based active material of Formula 2 may be a nickel-based active material of Formula 2-1 below. In Formula 2, 0.001≤x≤0.5, for example, 0.001≤x≤0.334, 0.001≤y≤0.5, for example, 0.001≤y≤0.334, and 0≤z<1, for example, z=0 are satisfied.

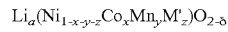  [Formula 2-1]

In some embodiments, in Formula 2-1, M' is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and 0.95≤a≤1.3, x≤(1-x-y-z), y≤(1-x-y-z), z≤(1-x-y-z), 0<x<1, 0≤y<1, 0≤z<1, and 1.998≤2-δ≤2.000 are satisfied.

In some embodiments, in Formula 2-1, 0.3≤1-x-y-z≤0.99, 0.5<1-x-y-z≤0.99, 0.6<1-x-y-z≤0.99, 0.8≤1-x-y-z≤0.99, or 0.8≤1-x-y-z≤0.95 is satisfied.

In Formula 2-1, 0.001≤x≤0.5, for example, 0.001≤x≤0.334, 0.001≤y≤0.5, for example, 0.001≤y≤0.334, and 0≤z<1, for example, z=0 are satisfied.

The nickel-based active material of Formula 2 may be a nickel-based active material of Formula 3 below.

  [Formula 3]

In some embodiments, in Formula 3, M is at least one element selected from boron (B), magnesium (Mg), calcium (Ca), strontium (Sr), barium (Ba), titanium (Ti), vanadium (V), chromium (Cr), iron (Fe), copper (Cu), Zirconium (Zr), and aluminum (Al), and 0.995≤a≤1.04, 0.3≤1-x-y-z≤0.99, 0.001≤x≤0.334, 0.001≤y≤0.334, 0≤z<1, and 1.98≤2-δ≤2 are satisfied in Formula 3, 0.3≤1-x-y-z≤0.99, 0.5<1-x-y-z≤0.99, 0.6<1-x-y-z≤0.99, 0.8≤1-x-y-z≤0.99, or 0.8≤1-x-y-z≤0.95 is satisfied. In Formula 3, 0.001≤x≤0.5, for example, 0.001≤x≤0.334, 0.001≤y≤0.5, for example, 0.001≤y≤0.334, and 0≤z<1, for example, z=0 are satisfied.

In Formulas 2 and 3, M is Mg, Al, Ti, Zr, or a combination thereof, and 2-δ is 2.

The thickness of the cobalt-boron compound-containing coating layer is 100 nm or less, for example, 1 nm to 100 nm, 1 nm to 50 nm, or 5 nm to 50 nm. The above thicknesses are merely examples, and other thicknesses are also possible. When the thickness of the cobalt-boron compound-containing coating layer is within the above range, the effect of improving the image stability of the composite positive electrode active material is excellent.

In the nickel-based active material of Formula 2 or 3, as described above, the content of nickel is greater than that of cobalt, and the content of nickel is greater than that of manganese. In Formula 2, 0.95≤a≤1.3, 0<x≤0.3, 0≤y≤0.5, 0≤z≤0.05, and 0.5≤(1-x-y-z)≤0.95 are satisfied. In Formula 2 or 3, a is 1 to 1.1, x is 0.1 to 0.3, and y is 0.05 to 0.3. According to an embodiment, in Formula 2 or 3, z is 0. According to another embodiment, in Formula 2 or 3, M may be aluminum in the case of 0<z≤0.05.

The content of nickel is greater than that of each of other transition metals, based on a total of 1 mol of the transition metals. Here, the transition metals refers to all metals other than lithium in the nickel-based active material. As such, when the nickel-based active material having a high nickel content is used, when using a lithium secondary battery having a positive electrode including this nickel-based active material, lithium diffusivity is high, conductivity is good, and higher capacity may be obtained at the same voltage. However, there is a problem in that lifetime characteristics are deteriorated due to the occurrence of cracks during the lifespan described above.

The content of nickel is, for example, 50 mol % to 95 mol %, or 70 mol % to 95 mol %. The above contents of nickel are merely examples, and other contents are also possible. The nickel-based active material is $Li_{1.01}Ni_{0.8}Co_{0.1}Mn_{0.1}O_2$, $Li_{1.01}Ni_{0.8}Co_{0.1}Al_{0.1}O_2$, $Li_{1.01}Ni_{0.8}Co_{0.05}Mn_{0.15}O_2$, $Li_{1.01}Ni_{0.8}Co_{0.15}Mn_{0.05}O_2$, $Li_{1.01}Ni_{0.8}Co_{0.05}Al_{0.15}O_2$, $Li_{1.01}Ni_{0.8}Co_{0.15}Al_{0.05}O_2$, or a combination thereof. The above nickel-based active material are merely examples, and other nickel-based active material are also possible.

The nickel-based active material and the composite positive electrode active material have a structure comprising primary particles. The primary articles are aggregated to form spherical secondary particles. The average particle diameter of the secondary particles is, for example, 1 μm to 25 μm or 5 μm to 25 μm. The above average particle diameters are merely examples, and other average particle diameters are also possible. The average particle diameter of the secondary particles may be, for example, a median diameter (D50) measured by utilizing a laser diffraction particle diameter distribution meter, scanning electron microscope (SEM), and/or a transmission electron microscope (TEM).

The composite positive electrode active material according to an embodiment may be prepared according to the following method.

First, a nickel-based active material, a cobalt precursor, and a first solvent are mixed to prepare a mixture. The nickel-based active material may be a compound represented by Formula 1 above.

The cobalt precursor is, for example, cobalt chloride, cobalt nitrate, cobalt sulfate, cobalt oxide, cobalt carbonate, cobalt citrate, cobalt acetate, or a combination thereof. The above cobalt precursors are merely examples, and other cobalt precursors are also possible. The content of the cobalt precursor is stoichiometrically controlled so that the content of the cobalt-boron compound in the composite positive electrode active material is 0.001 parts by weight to 10 parts by weight based on 100 parts by weight of the nickel-based active material. The above range is merely an example, and other ranges are also possible.

As the first solvent, any solvent may be used as long as it can dissolve or disperse the nickel-based active material and the cobalt precursor. The first solvent is, for example, distilled water, ethanol, methanol, isopropanol, butanol, pentanol, or a combination thereof.

A boron reducing agent and a second solvent are added to the mixture, and a reaction is performed at room temperature (25° C.) under an inert gas atmosphere. As such, in the composite positive electrode active material, a coating layer may be evenly formed on the surface of the nickel-based active material by a reaction at room temperature without performing a heat treatment process. If heat treatment is carried out, since cobalt-boron on the surface diffused into the active material, a composite positive electrode active material in which a flake or cage type cobalt-boron compound-containing coating layer is formed on the surface may not be obtained. The flake may be nanoflake.

The boron reducing agent is sodium borohydride ($NaBH_4$), sodium cyanoborohydride ($NaCNBH_3$), sodium acetoxyborohydride ($NaBH_3OAc$), or a mixture thereof. The above boron reducing agents are merely examples, and other boron reducing agents are also possible. The content of the boron reducing agent is stoichiometrically controlled so that the content of the cobalt-boron compound in the composite positive electrode active material is 0.001 parts by weight to 10 parts by weight based on 100 parts by weight of the nickel-based active material. The above range is merely an example, and other ranges are also possible.

The second solvent is, for example, distilled water, ethanol, methanol, isopropanol, butanol, pentanol, or a combination thereof. The above solvents are merely examples, and other solvents are also possible.

The nickel-based active material of Formula 2 may be prepared by a method widely known in the art.

When using the method of preparing a composite positive electrode active material according to an embodiment, it is possible to obtain a composite positive electrode active material having high capacity, improved charging/discharging efficiency and lifetime.

In the composite positive electrode active material, the oxidation number of cobalt in the coating layer may be +2+α ($-1<\alpha<1$), for example, +2+δ ($0\leq\delta<1$). The oxidation number of cobalt in the coating layer is, for example, 2.1 to 2.5. As such, the oxidation number of cobalt in the cobalt-boron compound-containing coating layer is lower than the oxidation number of cobalt in the nickel-based active material, which is +3. As such, In the cobalt-boron compound constituting the coating layer, it may be confirmed through X-ray photoelectron spectroscopy that cobalt has a low oxidation number. The peak of Co 2p3/2 of XPS is shifted toward low binding energy.

According to the composite positive electrode active material, in the X-ray photoelectron spectroscopy for the composite positive active material, a first peak corresponding to Co 2p1/2 appears at a binding energy of 793 eV to 796 eV, a second peak corresponding to Co 2p3/2 appears at a binding energy of 778 eV to 781 eV, and the intensity ratio of the first peak and the second peak is 1:1.18 to 1:1.26. The above range is merely an example, and other ranges are also possible.

Hereinafter, a method of manufacturing a lithium secondary battery, the battery including a positive electrode containing the composite positive electrode active material according to an embodiment, a negative electrode, a lithium salt-containing non-aqueous electrolyte, and a separator, will be described.

The positive electrode and the negative electrode are prepared by applying and drying a composition for forming a positive electrode active material layer and a composition for forming a negative electrode active material layer on current collectors, respectively.

The composition for forming a positive electrode active material is prepared by mixing a positive electrode active material, a conductive agent, a binder, and a solvent. As the positive electrode active material, the composite positive electrode active material according to an embodiment is used.

The binder, which is a component aiding in bonding between the positive electrode active material and the conductive agent and bonding to the current collector, is added in an amount of 1 part by weight to 50 parts by weight based on 100 parts by weight of the total weight of the positive electrode active material. The above range is merely an example, and other ranges are also possible. Non-liming examples of the binder may include polyvinylidene fluoride, polyvinyl alcohol, carboxymethylcellulose (CMC), starch, hydroxypropylcellulose, recycled cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, and various copolymers. The above binders are merely examples, and other binders are also possible. The content of the binder is 2 parts by weight to 5 parts by weight based on 100 parts by weight of the total weight of the positive electrode active material. The above range is merely an example, and other ranges are also possible. When the content of the binder is within the above range, the binding force of the active material layer to the current collector is good.

The conductive agent is not particularly limited as long as it has conductivity without causing chemical changes to the battery, and examples thereof may include graphite such as natural graphite or artificial graphite; carbon-based materials such as carbon black, acetylene black, ketjen black, channel black, furnace black, lamp black, and thermal black; conductive fibers such as carbon fibers and metal fibers; carbon fluoride; metal powders such as aluminum powder and nickel powder; conductive whisker such as zinc oxide and potassium titanate; conductive metal oxides such as titanium oxide; and conductive materials such as polyphenylene derivatives. The above conductive agents are merely examples, and other conductive agents are also possible.

The content of the conductive agent is 2 parts by weight to 5 parts by weight based on 100 parts by weight of the total weight of the positive electrode active material. The above range is merely an example, and other ranges are also possible. When the content of the conductive agent is within the above range, the finally obtained electrode has excellent conductivity properties.

A non-limiting example of the solvent may include N-methylpyrrolidone

The content of the solvent is 100 to 3000 parts by weight based on 100 parts by weight of the positive electrode active material. The above range is merely an example, and other ranges are also possible. When the content of the solvent is within the above range, the operation for forming an active material layer is easy.

The positive electrode current collector has a thickness of 3 μm to 500 μm, and is not particularly limited as long as it has high conductivity without causing chemical changes in the battery, and non-limiting examples thereof may include current collectors made of stainless steel, aluminum, nickel, titanium, heat-treated carbon, aluminum or stainless steel is surface-treated with carbon, nickel, titanium, or silver. The above range is merely an example, and other ranges are also possible. The current collector may increase the adhesion force of the positive electrode active material by forming fine irregularities on its surface, and various forms such as films, sheets, foils, nets, porous bodies, foams, and nonwoven fabrics are possible.

Separately, an negative active material, a binder, a conductive agent, and a solvent are mixed to prepare a composition for forming a negative electrode active material layer.

The negative electrode active material is a material capable of absorbing and desorbing lithium ions. Non-limiting examples of the negative electrode active material may include carbon-based materials such as graphite and carbon, lithium metals and alloys thereof, and silicon oxide-based materials. According to an embodiment of the present disclosure, silicon oxide is used.

The binder is added in an amount of 1 part by weight to 50 parts by weight based on 100 parts by weight of the total weight of the negative electrode active material. The above range is merely an example, and other ranges are also possible. As the non-limiting examples of such a binder, the same binder as in the positive electrode may be used.

The content of the conductive agent may be 1 part by weight to 5 parts by weight, based on 100 parts by weight of the total weight of the negative electrode active material layer. The above range is merely an example, and other ranges are also possible. When the content of the conductive agent is within the above range, the conductivity characteristics of finally obtained electrode are excellent.

The content of the solvent is 100 parts by weight to 3000 parts by weight based on 100 parts by weight of the negative electrode active material. The above range is merely an example, and other ranges are also possible. When the content of the solvent is within the above range, the operation for forming the negative electrode active material layer is easy.

As the conductive agent and the solvent, the same type of material as in manufacturing the positive electrode may be used.

The negative electrode current collector is generally made to have a thickness of 3 μm to 500 μm. The above range is merely an example, and other ranges are also possible. The positive electrode current collector is not particularly limited as long as it has high conductivity without causing chemical changes in the battery, and non-limiting examples thereof may include current collectors made of stainless steel, aluminum, nickel, titanium, heat-treated carbon, aluminum or stainless steel is surface-treated with carbon, nickel, titanium, or silver. and a current collector made of an aluminum-cadmium alloy. The above negative electrode current collector are merely examples, and other negative electrode current collectors are also possible.

Like the positive electrode current collector, the negative electrode current collector may increase the adhesion force of the negative electrode active material by forming fine irregularities on its surface, and various forms such as films, sheets, foils, nets, porous bodies, foams, and nonwoven fabrics are possible.

A separator is interposed between the positive electrode and negative electrode prepared according to the above processes.

The separator has a pore diameter of 0.01 μm to 10 μm and a thickness of 5 μm to 300 μm. The above ranges are merely examples, and other ranges are also possible. Specifically, as the separator, an olefin-based polymer such as polypropylene or polyethylene; or a sheet or nonwoven fabric made of glass fiber is used. When a solid electrolyte such as a polymer is used as the electrolyte, the solid electrolyte may also serve as the separator.

The lithium salt-containing non-aqueous electrolyte includes a non-aqueous electrolyte and a lithium salt. As the non-aqueous electrolyte, a non-aqueous electrolyte solution, an organic solid electrolyte, an inorganic solid electrolyte, or the like is used.

Non-limiting examples of the non-aqueous electrolyte may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, N, N-formamide, N,N-dimethylformamide, dioxolane, acetonitrile, nitromethane, methyl formate, methyl acetate, phosphoric acid triesters, trimethoxy methane, dioxolane derivatives, sulfolane, methyl sulfolane, 1,3-dimethyl-2-imidazolidinone, propylene carbonate derivatives, tetrahydrofuran derivatives, ethers, methyl pyropionate, and ethyl propionate. The above non-aqueous electrolytes are merely examples, and other non-aqueous electrolytes are also possible.

Non-limiting examples of the organic solid electrolyte may include polyethylene derivatives, polyethylene oxide derivatives, polypropylene oxide derivatives, phosphoric ester polymer, polyester sulfide, polyvinyl alcohol, and polyvinylidene fluoride. The above organic solid electrolyte are merely examples, and other organic solid electrolyte are also possible.

Non-limiting examples of the inorganic solid electrolyte may include nitrides, halogenides and sulfates of lithium (Li) such as $Li_3N$, $LiI$, $Li_3NI_2$, $Li_3N$—$LiI$—$LiOH$, $LiSiO_4$, $Li_2SiS_3$, $Li_4SiO_4$, $Li_4SiO_4$—$LiI$—$LiOH$, and $Li_3PO_4$—$Li_2S$—$SiS_2$. The above inorganic solid electrolyte are merely examples, and other inorganic solid electrolyte are also possible.

Non-limiting examples of the lithium salt, as materials easily soluble in the non-aqueous electrolyte, may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, and $(FSO_2)_2NLi$. The above lithium salts are merely examples, and other lithium salts are also possible.

FIGS. 7A to 7D are embodiments of schematic cross-sectional views illustrating the structure of a lithium secondary battery according to an embodiment.

Figure 15:
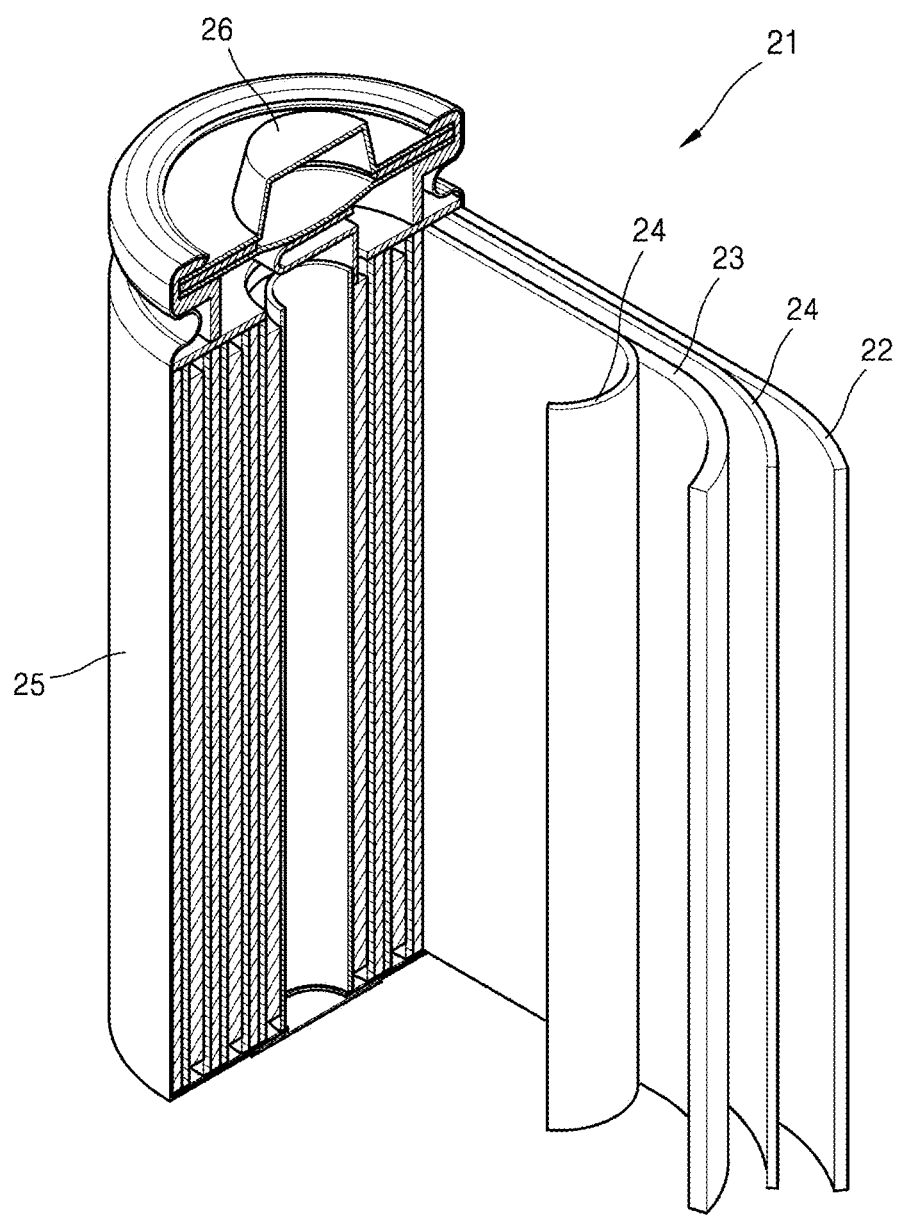
FIG. 15 is an embodiment of a schematic view illustrating the structure of a lithium secondary battery according to an embodiment.

Referring to FIG. 15, a lithium secondary battery 21 includes a positive electrode 23, a negative electrode 22, and a separator 24. The positive electrode 23, the negative electrode 22, and the separator 24 are wound or folded to be accommodated in a battery case 25. Subsequently, an organic electrolyte is injected into the battery case 25 and sealed with a cap assembly 26 to complete the lithium secondary battery 20. The battery case 25 may be a cylindrical case, a rectangular case, a thin film case, or the like. For example, the lithium secondary battery 20 may be a large thin film battery. The lithium secondary battery may be a lithium ion battery. The separator 24 may be disposed between the positive electrode 23 and the negative electrode 22 to form a cell structure. After the cell structure is laminated in a bi-cell structure, the laminated cell structure is impregnated with an organic electrolyte, and the resulting product is accommodated in a pouch and sealed to complete a lithium ion polymer battery. Further, the plurality of cell structures are stacked to form a battery pack, and this battery pack may be used in all appliances requiring high capacity and high output. For example, this battery pack may be used in notebooks, smart phones, electric vehicles, and the like.

Further, since the lithium secondary battery has excellent storage stability, lifetime characteristics, and high rate characteristics at high temperatures, it may be used in electric vehicles (EV). For example, the lithium secondary battery may be used in hybrid vehicles such as plug-in hybrid electric vehicles (PHEV).

The present disclosure will be described in more detail with reference to the following Examples and Comparative Examples. However, these Examples are set forth to illustrate the present disclosure, and the scope of the present disclosure is not limited thereto.

Preparation of Nickel-Based Active Material

Comparative Preparation Example 1

Composite metal hydroxide ($Ni_{0.8}Co_{0.1}Mn_{0.1}(OH)_2$) was obtained according to a coprecipitation method to be described later.

Ammonia water was put into a reactor, and the pH of a mixture in the reactor was adjusted using the sodium hydroxide while stoichiometrically controlling a raw material of a nickel-based active material so as to obtain a composition of the final product to be produced. Next, while stirring, the introduction of a raw material solution was stopped until the desired size was obtained, and a drying process was performed to obtain a target product. These processes will be described in detail as follows.

Nickel sulfate ($NiSO_4 \cdot 6H_2O$), cobalt sulfate ($CoSO_4 \cdot 7H_2O$), and manganese sulfate ($MnSO_4 \cdot H_2O$), as raw materials of a nickel-based active material, were dissolved in distilled water as a solvent at a molar ratio of 8:1:1 to prepare a mixed solution. In order to form a complex compound, a dilute solution of ammonia water ($NH_4OH$) and sodium hydroxide (NaOH) as a precipitant were prepared. Thereafter, a mixed solution of metal raw materials, ammonia water, and sodium hydroxide were introduced into a reactor, respectively. Sodium hydroxide was added to maintain the pH inside the reactor. Next, a reaction was carried out for about 20 hours while stirring, and then the introduction of the raw material solution was stopped.

The slurry solution in the reactor was filtered and washed with high-purity distilled water, dried in a hot air oven for 24 hours to obtain composite metal hydroxide ($Ni_{0.8}Co_{0.1}Mn_{0.1}(OH)_2$) powder.

The composite metal hydroxide ($Ni_{0.8}Co_{0.1}Mn_{0.1}(OH)_2$) and lithium carbonate ($Li_2CO_3$) were mixed at a molar ratio of 1:1.05 by a dry method, and primarily heat-treated at 850° C. for 10 hours to obtain a nickel-based active material ($Li_{1.01}Ni_{0.8}Co_{0.1}Mn_{0.1}O_2$).

Comparative Preparation Example 2

The nickel-based active material ($Li_{1.01}Ni_{0.8}Co_{0.1}Mn_{0.1}O_2$) (NCM) obtained in Comparative Preparation Example 1, cobalt nitrate as a cobalt precursor, and ethanol as a solvent were mixed, and dried at 120° C. for 10 hours. Subsequently, the resultant was secondarily heat-treated at 780° C. for 10 hours to obtain a composite positive electrode active material having a cobalt-containing compound coating layer on the surface thereof. The content of the cobalt-containing compound in the composite positive electrode active material is 2.0 parts by weight based on 100 parts by weight of the nickel-based active material.

Comparative Preparation Example 3

The nickel-based active material ($Li_{1.01}Ni_{0.8}Co_{0.1}Mn_{0.1}O_2$) (NCM) obtained in Comparative Preparation Example 1 and $B_2O_3$ were mixed at a weight ratio of 100:0.2 by a dry method to uniformly adhere a $B_2O_3$ compound to the surface of NCM.

Subsequently, the resultant was heat-treated at 760° C. for 6 hours to obtain a nickel-based active material coated with a boron compound. The content of the boron compound is 0.2 parts by weight based on 100 parts by weight of the nickel-based active material.

Preparation of Composite Positive Electrode Active Material

Preparation Example 1

Cobalt nitrate ($Co(NO_3)_2$), the nickel-based active material ($Li_{1.01}Ni_{0.8}Co_{0.1}Mn_{0.1}O_2$) obtained in Comparative Preparation Example 1, and ethanol as a solvent were mixed, and were then degassed through nitrogen bubbling to obtain a composition. The content of cobalt nitrate is 0.1 parts by weight based on 100 parts by weight of the total weight of the nickel-based active material.

Subsequently, 3 ml of a 1.0 M $NaBH_4$ solution (solvent: methanol) was added to the composition under a nitrogen gas atmosphere to adjust pH of the composition to 8. This mixture was reacted at 25° C. for 2 hours to obtain a nickel-based active material having a cobalt-boron compound-containing coating layer on the surface thereof. The resultant was filtered in vacuum, and then heat-treated at 80° C. for 12 hours to obtain a desired composite positive electrode active material. The content of the cobalt-boron compound in the composite positive electrode active material is 0.1 parts by weight based on 100 parts by weight of the nickel-based active material.

Preparation Example 2

A composite positive electrode active material was obtained in the same manner as in Preparation Example 1, except that the content of cobalt nitrate is stoichiometrically changed such that the content of the cobalt-boron compound in the composite positive electrode active material is 5 parts by weight based on 100 parts by weight of the nickel-based active material.

Manufacture of Lithium Secondary Battery

Example 1

A lithium secondary battery was manufactured as follows using the composite positive electrode active material obtained according to Preparation Example 1 as a positive electrode active material.

A mixture of the composite positive electrode active material obtained according to Preparation Example 1, polyvinylidene fluoride, N-methylpyrrolidone as a solvent, and carbon black as a conductive agent was defoamed using a mixer to prepare a uniformly dispersed slurry for forming a positive electrode active material layer. The mixing weight ratio of the composite positive electrode active material, polyvinylidene fluoride, and carbon black is 90:5:5, and the content of the solvent is about 50 parts by weight based on 90 parts by weight of the composite positive electrode active material.

The slurry prepared according to the above process was applied on an aluminum foil using a doctor blade to form a thin electrode plate, and then this thin electrode plate was dried at 135° C. for 3 hours or more, rolled and dried in vacuum to prepare a positive electrode.

A 2032 type coin half cell was manufactured using the positive electrode and a lithium metal counter electrode as a counter electrode of the positive electrode. A separator (thickness: about 16 μm) made of a porous polyethylene (PE) film was interposed between the positive electrode and the lithium metal counter electrode, and an electrolyte was injected to manufacture a 2032 type lithium secondary battery. In this case, as the electrolyte, a solution in which 1.3M $LiPF_6$ is dissolved in a solvent in which ethylene carbonate (EC), ethyl methyl carbonate (EMC), and dimethylene carbonate (DMC) are mixed at a volume ratio of 3:4:3 was used.

Example 2

A lithium secondary battery was manufactured in the same manner as in Example 1, except that the nickel-based active material of Preparation Example 2 was used instead of the nickel-based active material of Preparation Example 1.

Comparative Examples 1 to 3

Lithium secondary batteries were manufactured in the same manner as in Example 1, except that each of the nickel-based active materials of Comparative Preparation Example 1 to 3 was used instead of the nickel-based active material of Preparation Example 1.

Evaluation Example 1: Scanning Electron Microscope (SEM)

Scanning electron microscope analysis of the states of the composite positive electrode active material of Preparation Example 1 before and after the formation of the cobalt-boron compound-containing coating layer was carried out. For comparison with the scanning electron microscope analysis of the composite positive electrode active material of Preparation Example 1, scanning electron microscope analyses of the composite positive electrode active materials of Comparative Preparation Examples 1 to 3 were also carried out.

A scanning electron microscope (Magellan 400L, manufactured by FEI company) was used. Sample sections were milled at a voltage of 6 kV and a current of 320 uA for 1 hour using IM4000PLUS (manufactured by Hitachi Corporation) to perform pretreatment. Scanning electron microscope analysis was carried out at 3 keV.

Figure 1B:
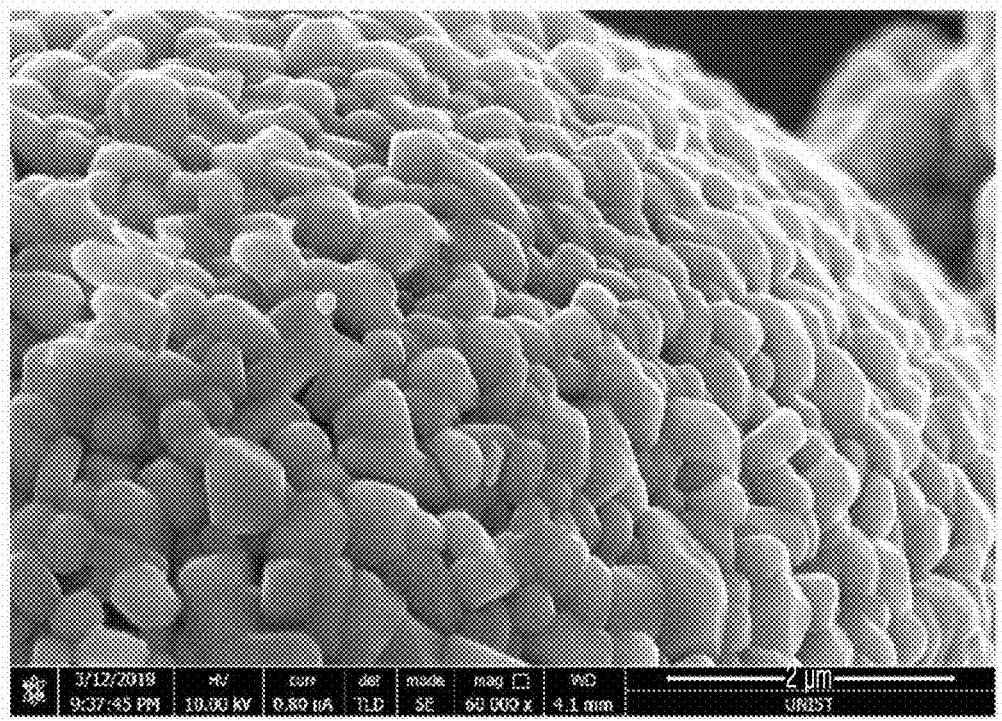
Figure 1C:
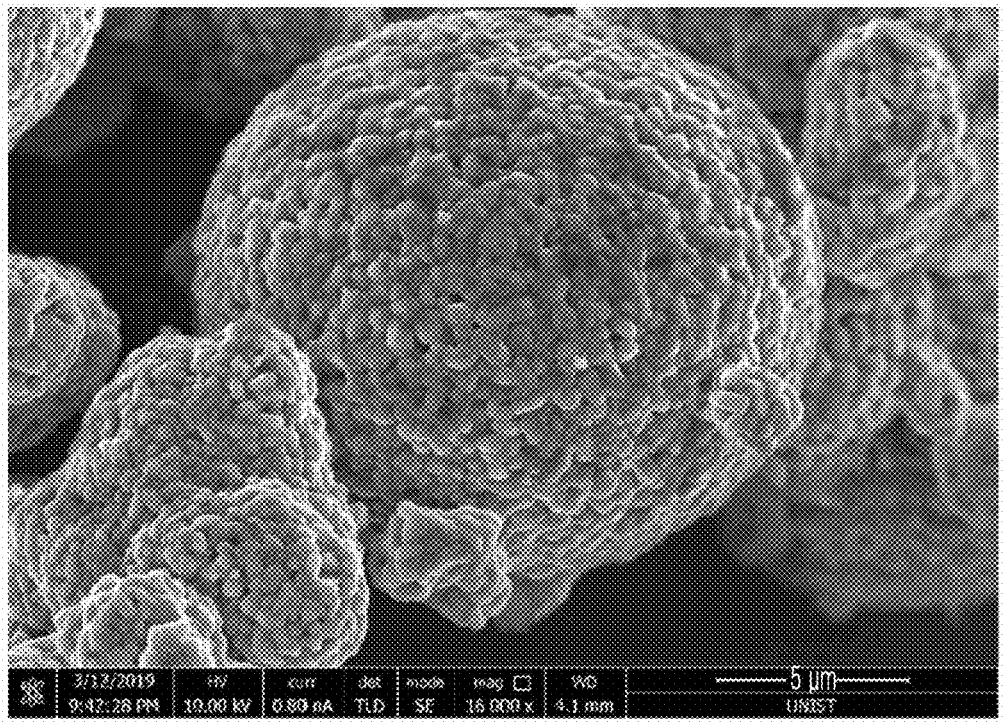
FIGS. 1C and 1D illustrate embodiments of the results of scanning electron microscopy analysis of the composite positive electrode active material of Preparation Example 1.
Figure 1D:
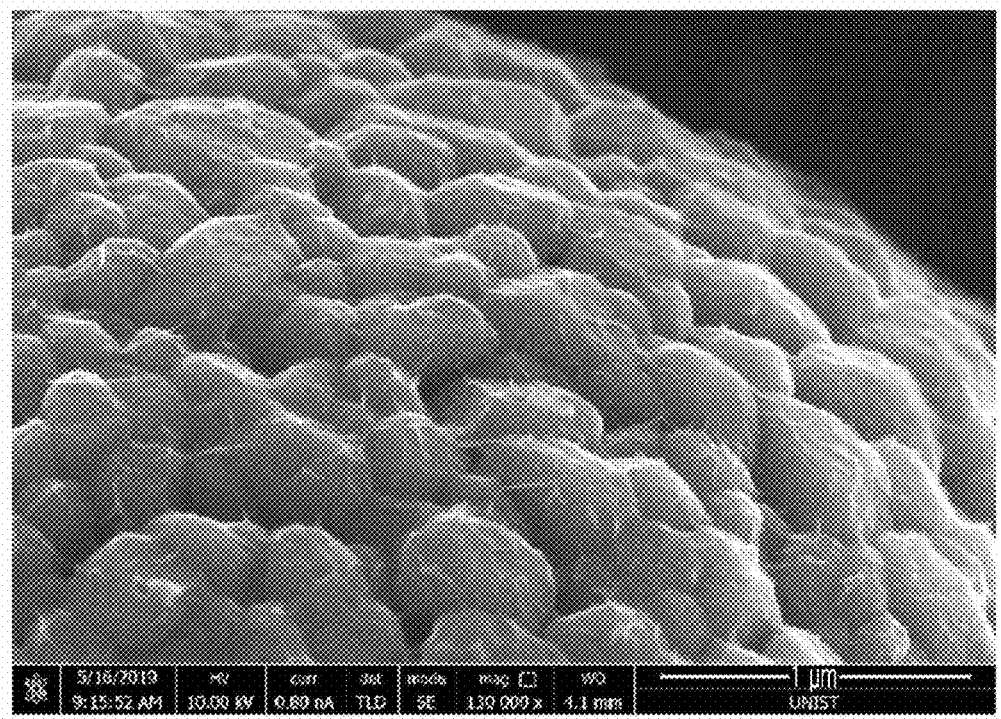
Figure 1E:
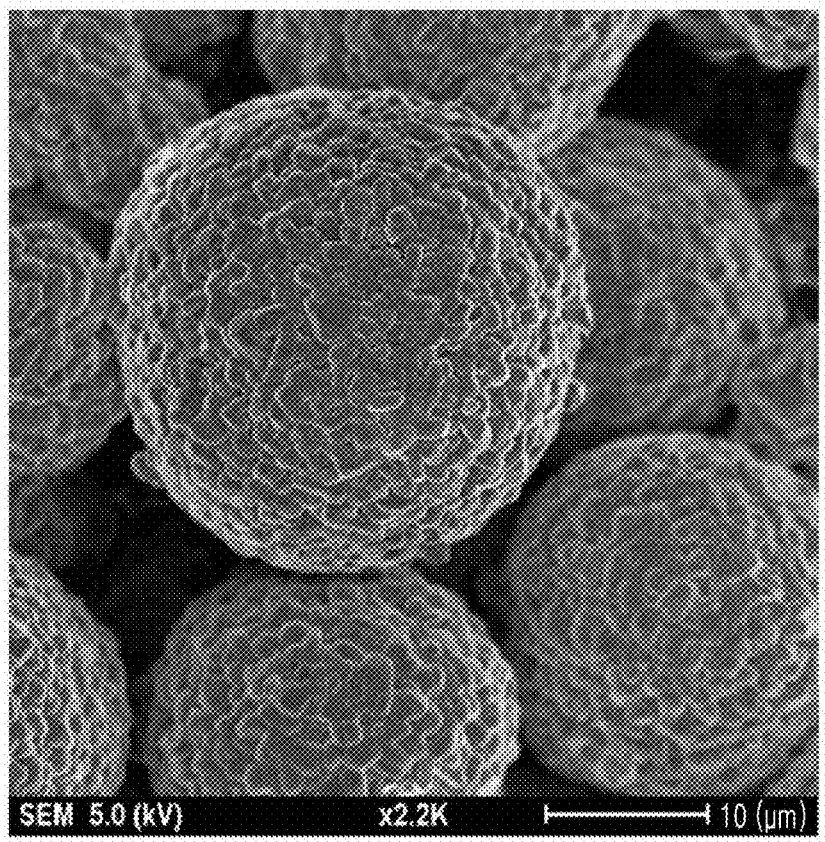
FIGS. 1E and 1F illustrate embodiments of the results of scanning electron microscopy analysis of the nickel-based active material of Comparative Preparation Example 2.
Figure 1F:
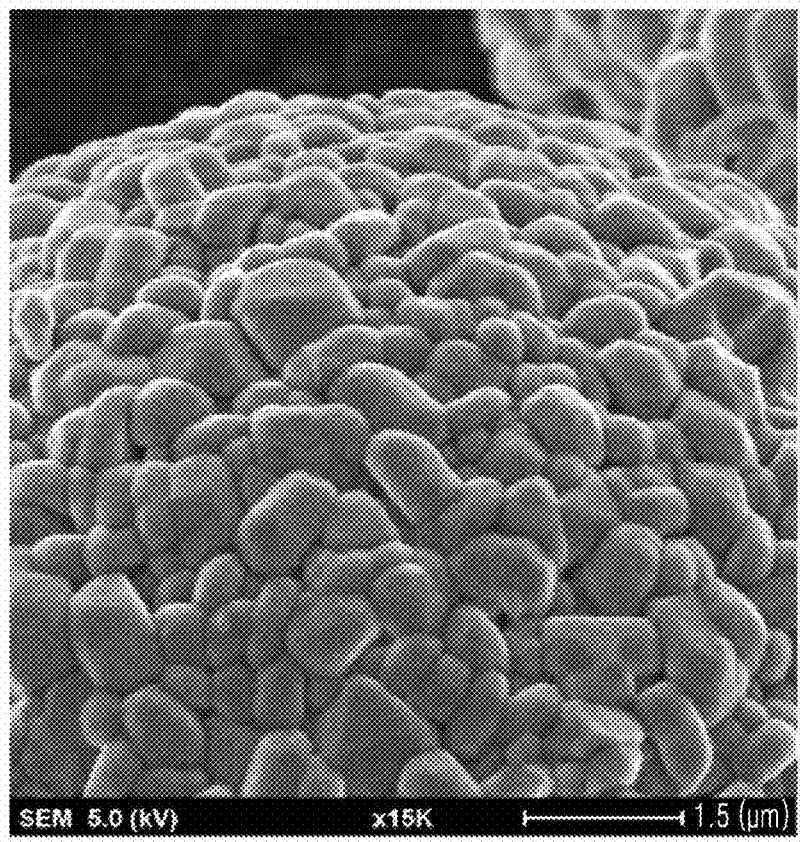
Figure 1G:
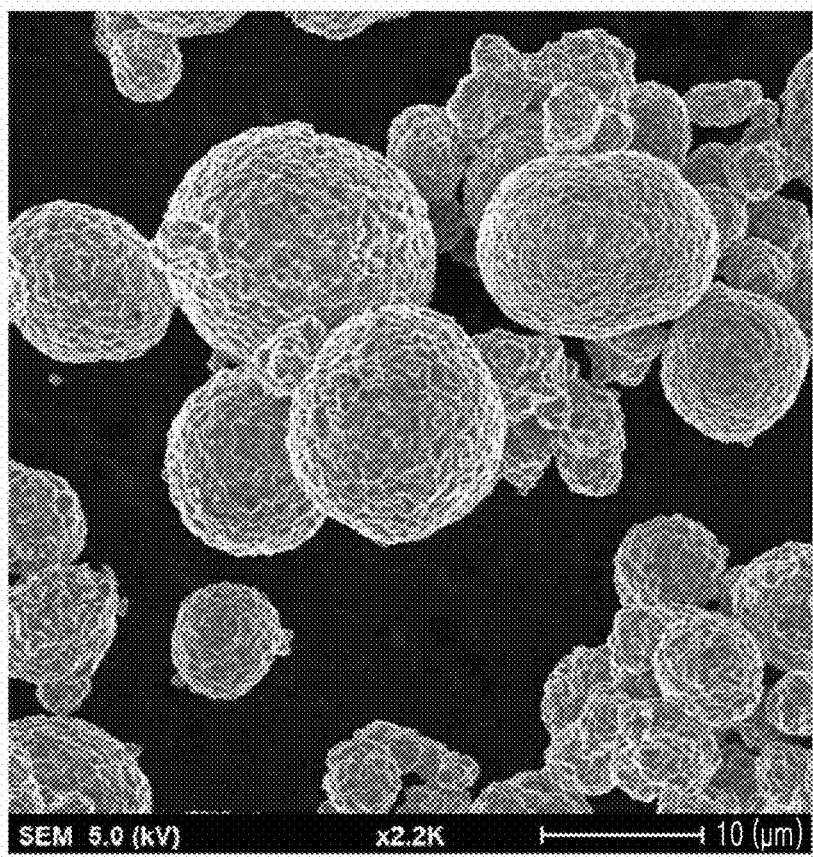
FIGS. 1G and 1H illustrate embodiments of the results of scanning electron microscopy analysis of the nickel-based active material of Comparative Preparation Example 3.
Figure 1H:
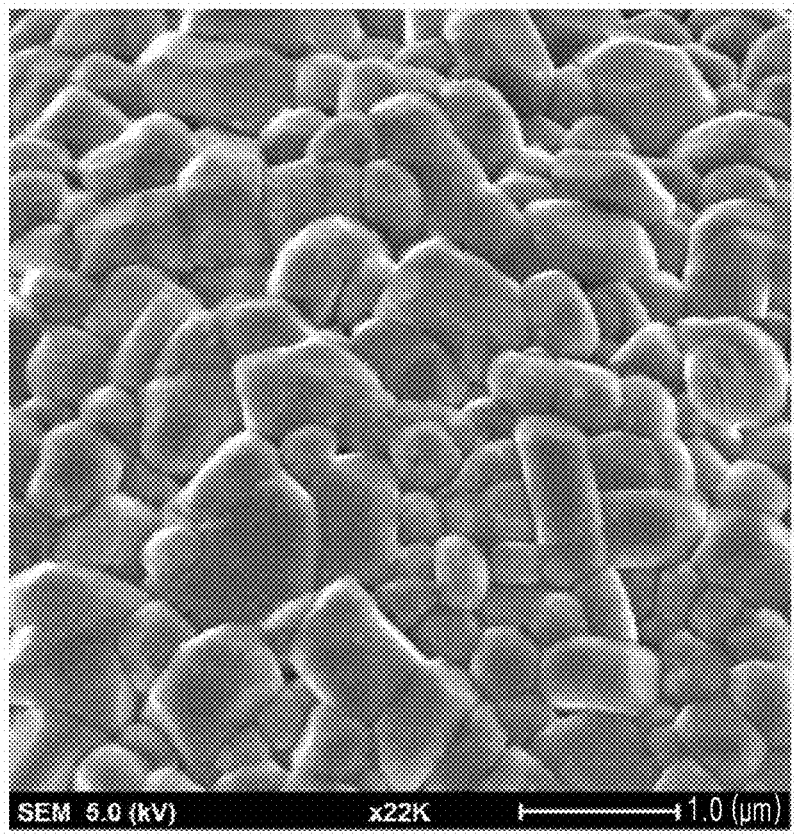

FIGS. 1A to 1H illustrate the results of scanning electron microscope analysis. FIGS. 1A and 1B illustrate the state of the nickel-based active material ($Li_{1.01} Ni_{0.8}Co_{0.1}Mn_{0.1}O_2$) of Comparative Preparation Example 1 before a coating layer is formed on the surface of the nickel-based active material, and FIG. 1B is an enlarged view of a portion of FIG. 1A. FIGS. 1C and 1D illustrate the state of the nickel-based active material of Preparation Example 1 after a coating layer is formed on the surface of the nickel-based active material of Comparative Preparation Example 1, and FIG. 1D is an enlarged view of a portion of FIG. 1C. FIGS. 1E and 1F illustrate the results of scanning electron microscope analysis of the nickel-based active material of Comparative Preparation Example 2, and FIGS. 1G and 1H illustrate the results of scanning electron microscope analysis of the nickel-based active material of Comparative Preparation Example 3.

Figure 2A:
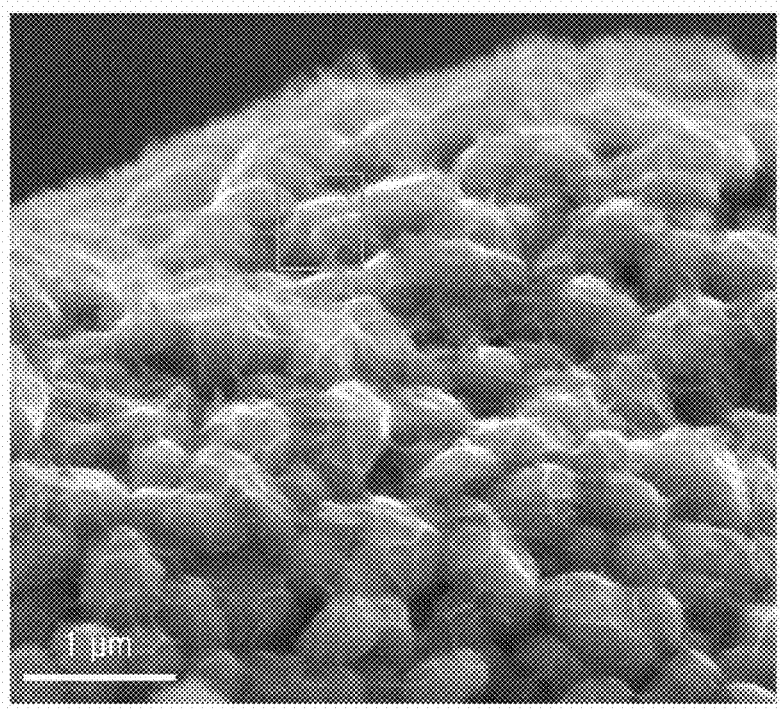
FIG. 2A illustrates an embodiment of a scanning electron microscope image of the composite positive electrode active material obtained according to Preparation Example 1.
Figure 2B:
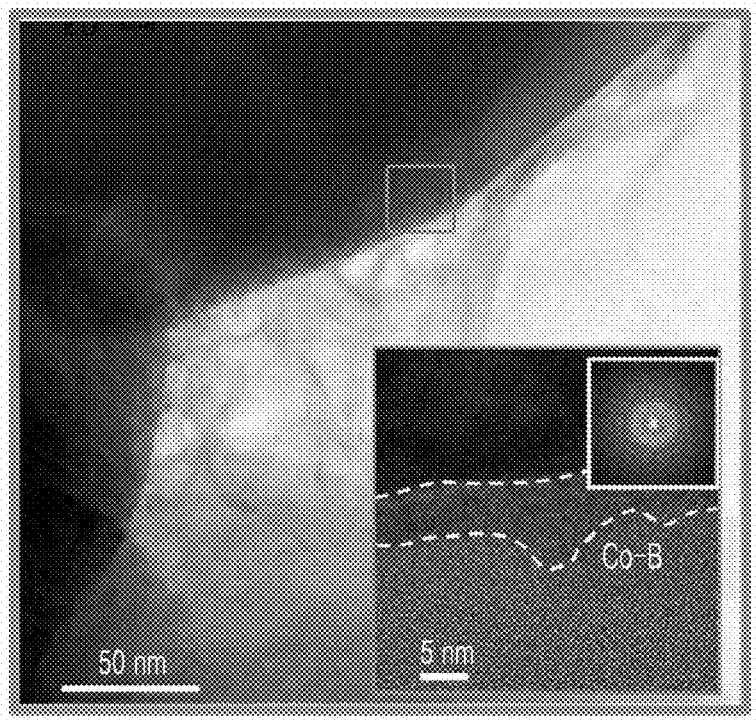
FIGS. 2B to 2F illustrate embodiments of the mapping result of the composite positive electrode active material obtained according to Preparation Example 1 using a transmission electron microscope-energy dispersive spectrometer (TEM-EDX)
Figure 2C:
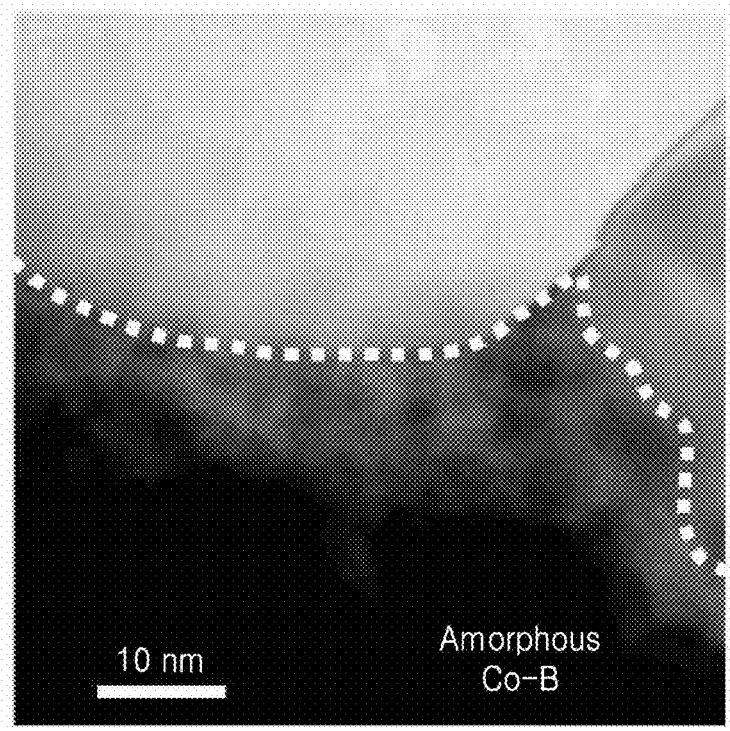
Figure 2D:
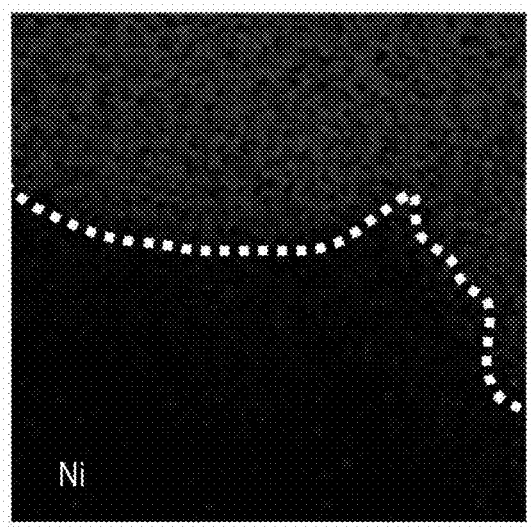
Figure 2E:
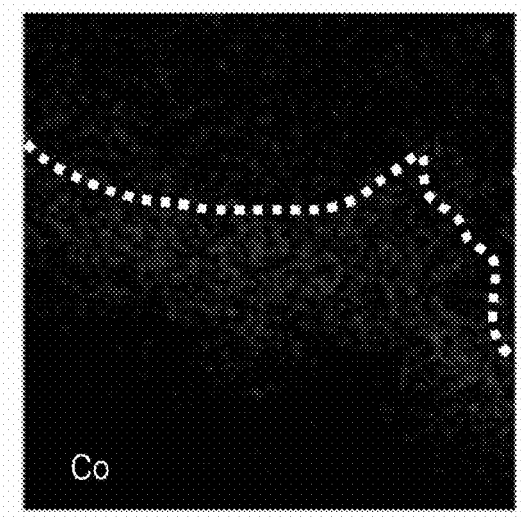

Referring to the above results, the composite positive electrode active material of Preparation Example 1 has a shape in which a cobalt-boron compound-containing coating layer is formed on the surface thereof. The state of the surface thereof is clearly different from those of the nickel-based active materials of Comparative Preparation Examples 1 to 3. As illustrated in FIGS. 1C and 1D, the cobalt-boron compound-containing coating layer of the composite positive electrode active material of Preparation Example 1 has a surface having flake or cage pattern, unlike those of the nickel-based active materials of Comparative Preparation Examples 2 and 3. Evaluation Example 2: TEM-EDX mapping SEM analysis and TEM-EDX mapping analysis of the composite positive electrode active material of Preparation Example 1 were carried out, and the analysis results thereof are illustrated in FIGS. 2A to 2F. TEM-EDX analysis was carried out using ARM300F of JEOL Corporation. FIG. 2A illustrates an SEM image of the composite positive electrode active material of Preparation Example 1, and FIGS. 2B to 2F illustrate the results of TEM-EDX analysis of the composite positive electrode active material of Preparation Example 1.

As illustrated in FIGS. 2A to 2F, it may be found that a cobalt-born compound (Co—B compound) is uniformly distributed on secondary particles. Further, as illustrated in a TEM image, the Co—B compound has an amorphous phase, and has a thickness of the Co—B compound containing coating layer about 15 nm. Here, it may be found that a FFT scattering pattern in the inner image of FIG. 2B was observed as a circular ring, and thus the Co—B compound has an amorphous phase.

Figure 2F:
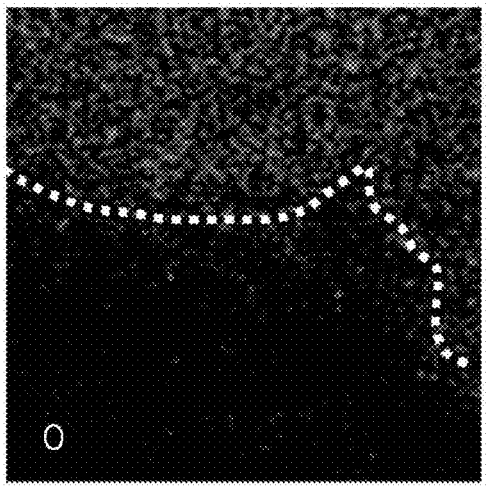

As suggested in the TEM-EDX results, the amorphous coating material was classified and distributed from the positive electrode active material based on dotted line. Further, as illustrated in FIG. 2F, it may found that low-intensity oxygen is attributed to synthesis condition under an inert atmosphere.

Evaluation Example 3: Analysis of Change of Electrode Plate Before and After Cycle Test In the lithium secondary batteries manufactured in Example 1 and Comparative Example 1, charge/discharge characteristics were evaluated by a charging/discharging machine (Model: TOYO-3100, manufactured by TOYO Corporation).

In the first charge/discharge cycle, each of the coin cells was charged with a constant current of 0.1 C until a voltage reached 4.40 V, and was then charged with a constant voltage until a current reached 0.05 C. The completely charged coin cell was discharged to a constant current of 0.1 C until the voltage reached 3V after a pause of about 10 minutes. In the second charge/discharge cycle, each of the coin cells was charged with a constant current of 0.2 C until a voltage reached 4.40 V, and was then charged with a constant voltage until a current reached 0.05 C. The completely charged coin cell was discharged to a constant current of 0.2 C until the voltage reached 3V after a pause of about 10 minutes.

In lifetime evaluation, each of the coin cells was charged with a constant current of 1 C until a voltage reached 4.40 V, and was then charged with a constant voltage until a current reached 0.05 C. The completely charged coin cell was discharged to a constant current of 1 C until the voltage reached 3V after a pause of about 10 minutes. The lifetime evaluation was performed by repeating this cycle.

Figure 3A:
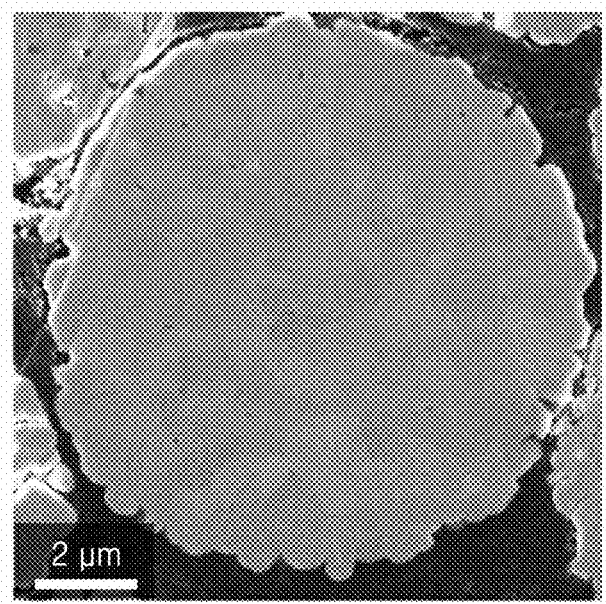
FIG. 3A illustrates an embodiment of an SEM image of the positive electrode of Example 1 after a cycle characteristic test.
Figure 3B:
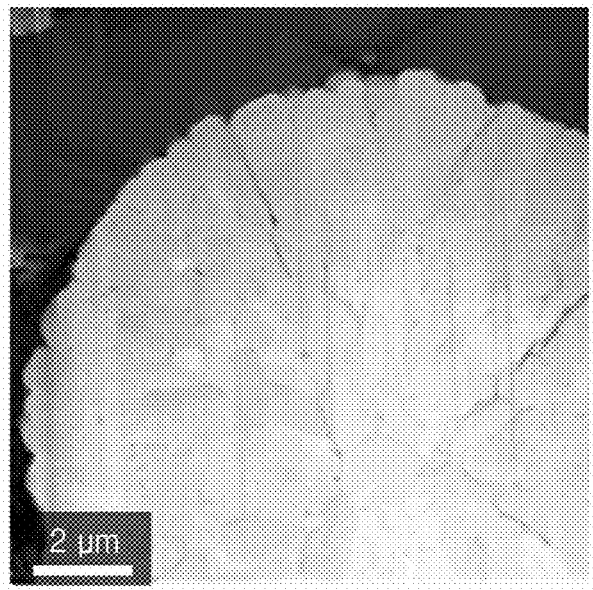
FIGS. 3B to 3D illustrate embodiments of the TEM-EDX analysis results of the positive electrode of Example 1 after a cycle characteristic test.
Figure 3C:
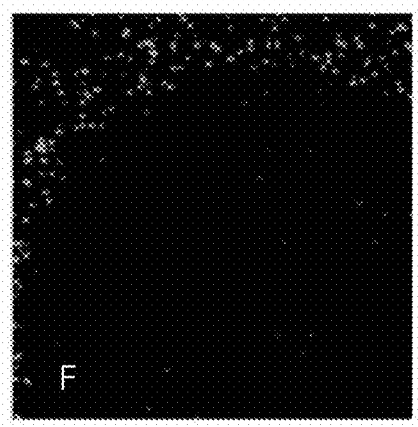
Figure 3D:
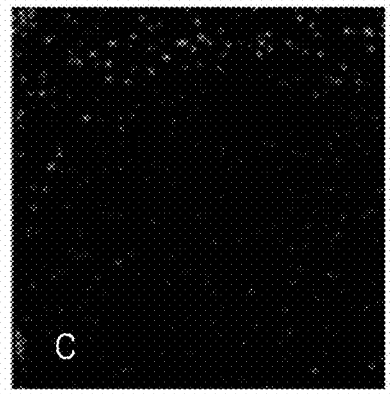
Figure 4A:
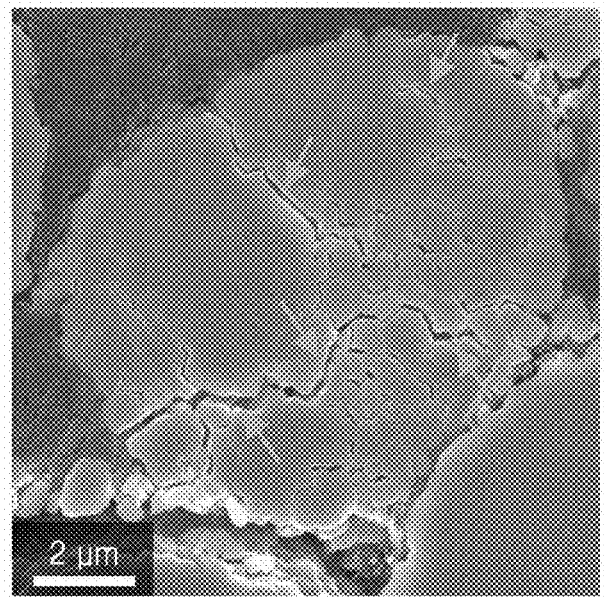
FIG. 4A illustrates an embodiment of an SEM image of the positive electrode of Comparative Example 1 after a cycle characteristic test.
Figure 4B:
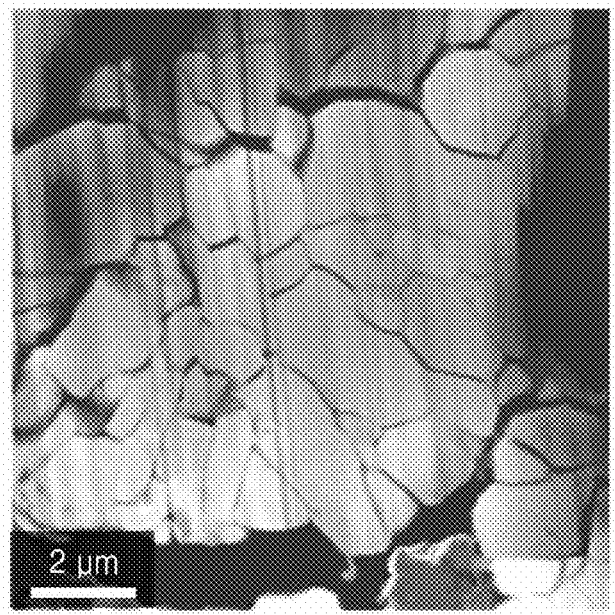
FIGS. 4B to 4D illustrate embodiments of the TEM-EDX analysis results of the positive electrode of Comparative Example 1 after a cycle characteristic test.
Figure 4C:
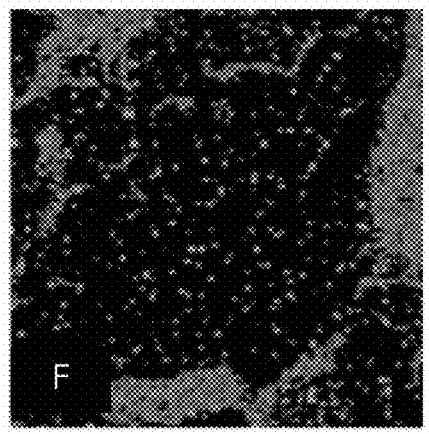
Figure 4D:
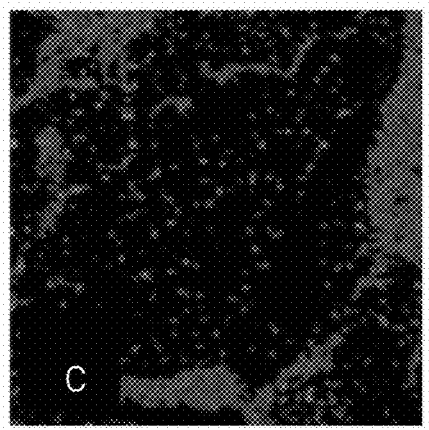
Figure 5A:
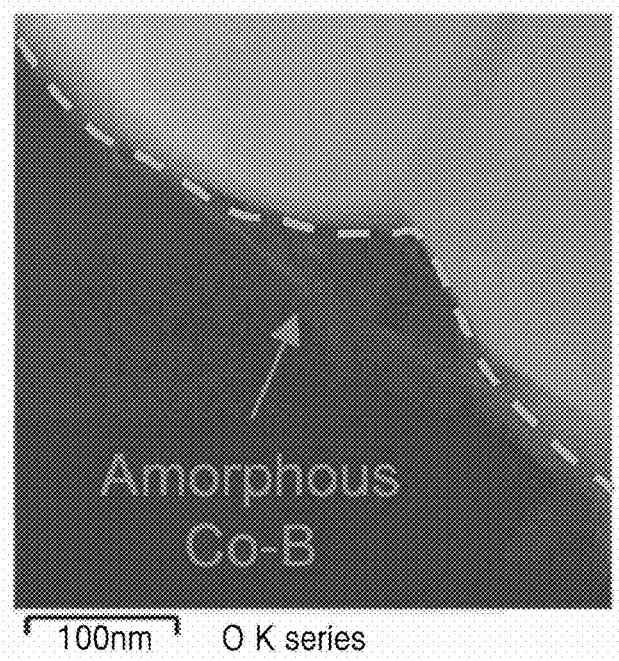
Figure 5B:
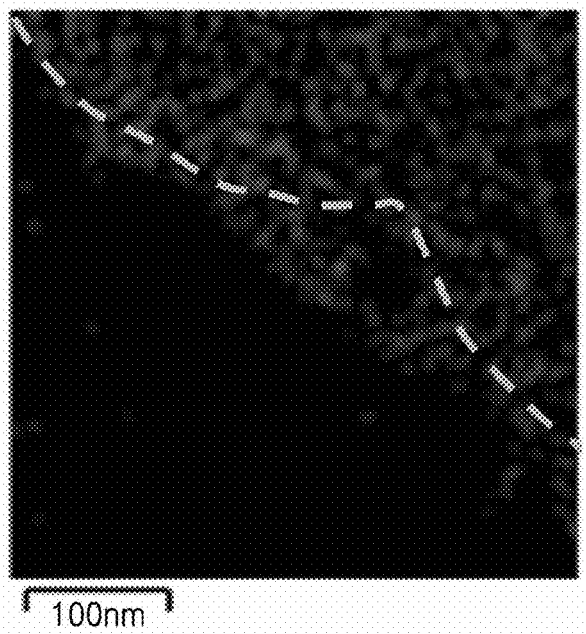
Figure 5C:
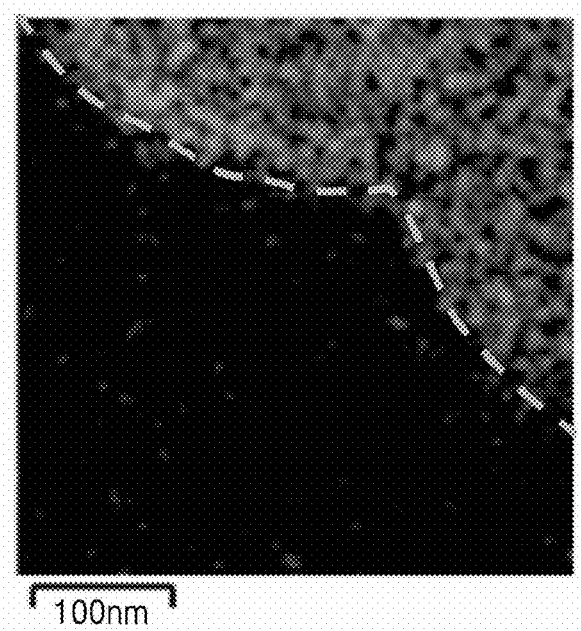

The states of electrode plates of positive electrodes after cycle characteristic tests were analyzed using SEM, and the results thereof are illustrated in FIGS. 3A to 3D and FIGS. 4A to 4D. FIG. 3A illustrates an SEM image of the positive electrode of Example 1 after a cycle characteristic test, and FIGS. 3B to 3D illustrate a TEM-EDAX state of the positive electrode of Example 1 after a cycle characteristic test. FIG. 4A illustrates an SEM image of the positive electrode of Comparative Example 1 after a cycle characteristic test, and FIGS. 4B to 4D illustrate a TEM-EDAX state of the positive electrode of Comparative Example 1 after a cycle characteristic test.

As illustrated in FIGS. 4A and 4B, it may be found that, in the positive electrode of Comparative Example 1, cracks or micro-cracks were observed in the positive electrode active material after the cycle characteristics test. As illustrated in FIGS. 4C and 4D, it may be found that fluorine and carbon were concentrated on the outermost surface of the composite positive electrode active material having a shape of secondary particles, and some of them were distributed along the micro-cracks formed in the secondary particles.

In contrast, as illustrated in FIGS. 4A and 4B, it may be found that, in the positive electrode of Example 1, few cracks or micro-cracks appeared after the cycle characteristics test. As illustrated in FIGS. 4C and 4D, it may be found that almost no fluorine and carbon were observed, and were not distributed along inner cracks.

Further, TEM-EDX images of composite positive electrode active material particles in the positive electrode of Example 1 after the cycle characteristic test were analyzed, and the results thereof are illustrated in FIGS. 5A to 5D.

Referring to the above results, it may be found that the cobalt-boron compound-containing coating layer formed in the synthesis process is not lost, and there are effects of maintaining high-voltage electrochemical lifetime and suppressing side reactions.

Evaluation Example 4: Pore Distribution Characteristics

In the composite positive active material of Preparation Example 1 and the nickel-based active material of Comparative Preparation Example 1, pore distribution characteristics were analyzed using BET analysis. The analysis results thereof are illustrated in FIGS. 6A to 6D.

Figure 6A:
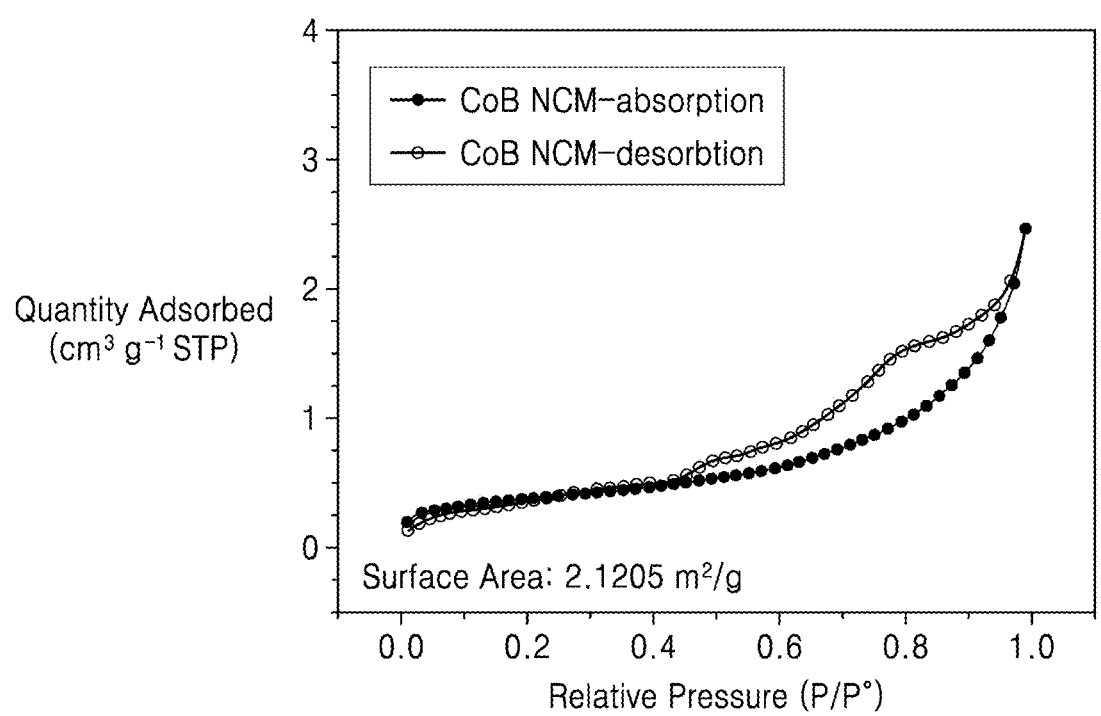
FIGS. 6A and 6B are embodiments of graphs illustrating the pore distribution characteristics of the composite positive electrode active material of Preparation Example 1.
Figure 6B:
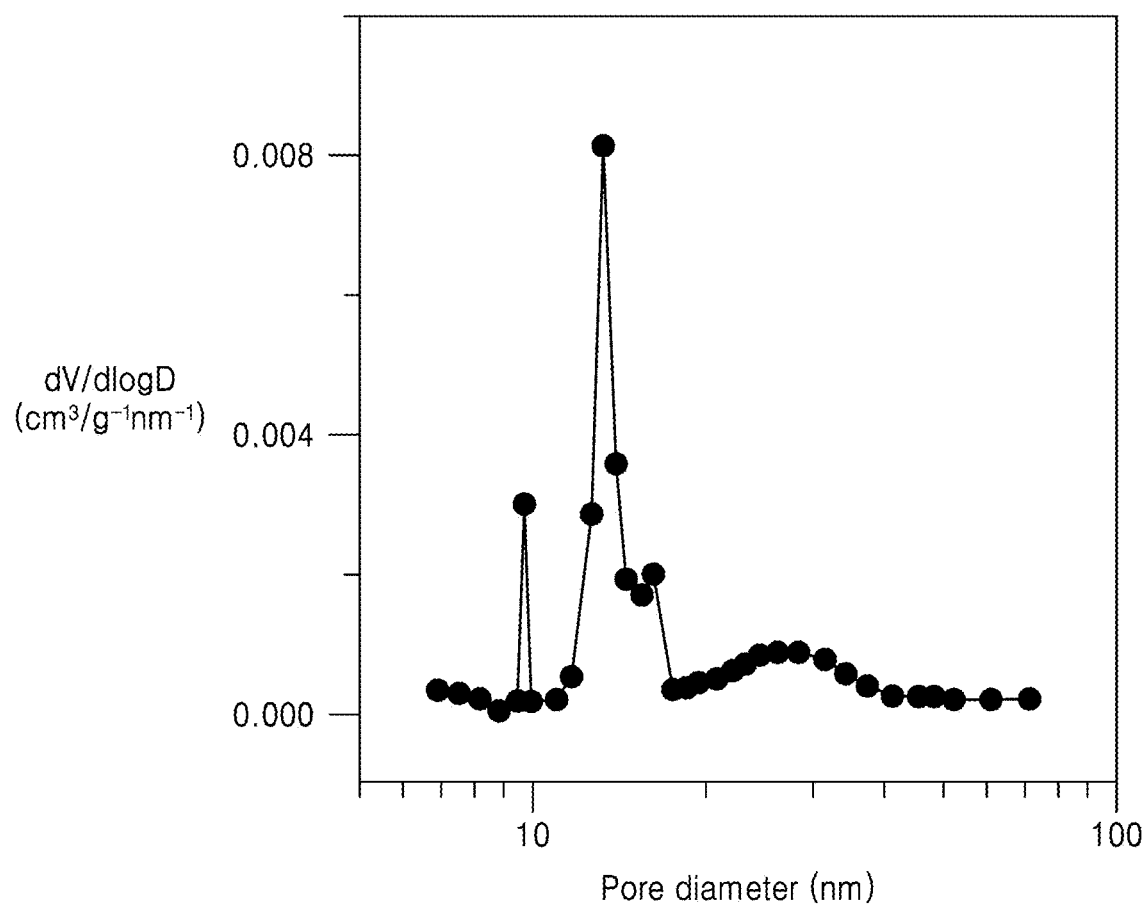

As illustrated in FIGS. 6A and 6B, the composite positive electrode active material of Preparation Example 1 shows a hysteresis curve in the medium-pressure area, which means that small-size mesopores having a small particle diameter are formed.

Figure 6C:
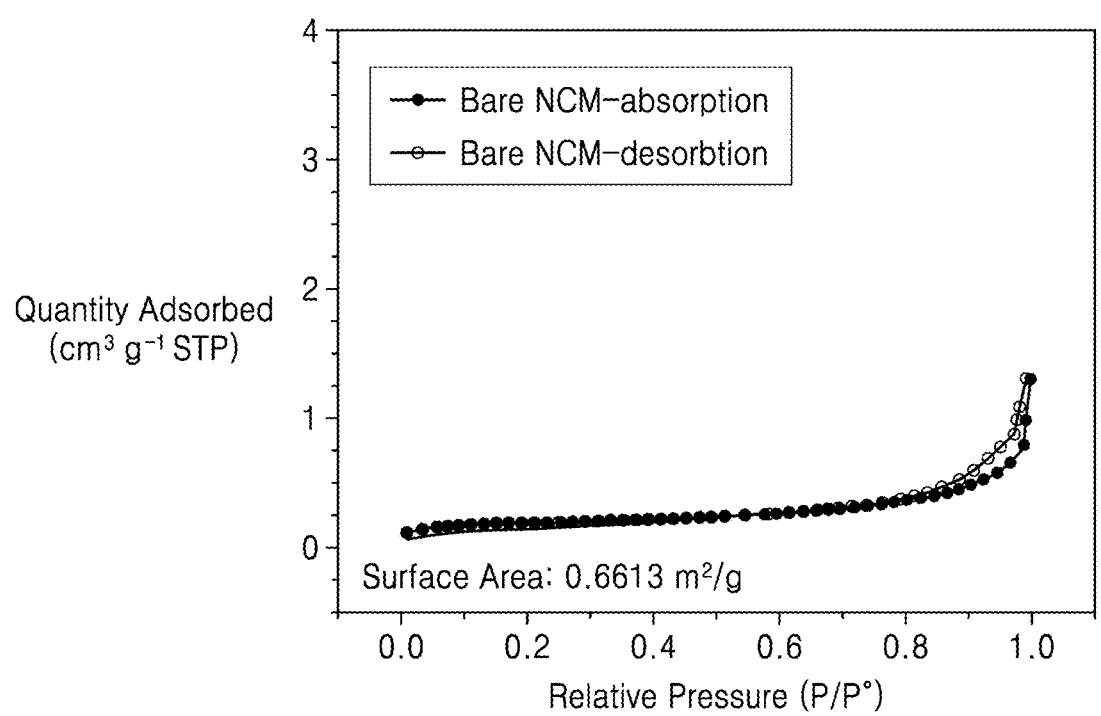
FIGS. 6C and 6D are embodiments of graphs illustrating the pore distribution characteristics of the nickel-based active material of Comparative Preparation Example 1 using a Brunauer-Emmett-Teller (BET) method.
Figure 6D:
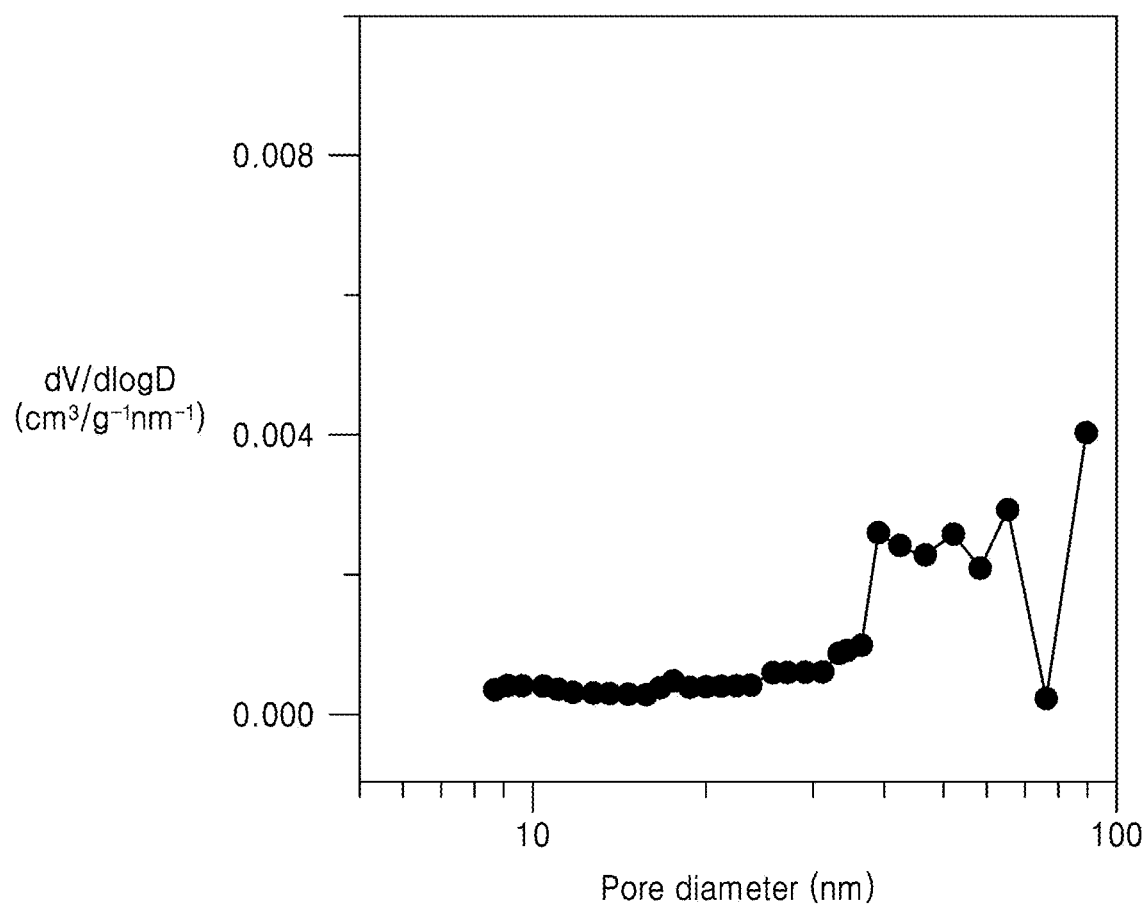

In contrast, as illustrated in FIGS. 6C and 6D, the nickel-based active material of Comparative Preparation Example 1 showed rapid growth in the high-pressure area. From this, it may be found that the voids of the nickel-based active material of Comparative Preparation Example 1 have characteristics of macropores.

Figure 7A:
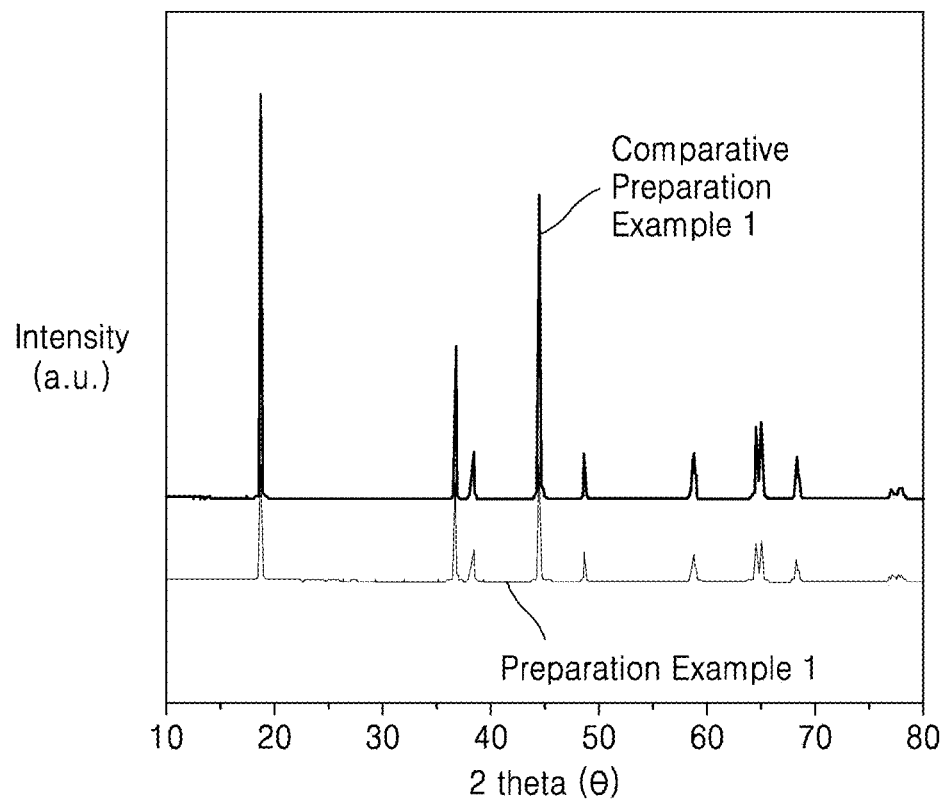
FIGS. 7A to 7D illustrate embodiments of the X-ray diffraction characteristics of the composite positive electrode active material of Preparation Example 1 and the nickel-based active material of Comparative Preparation Example 1.
Figure 7B:
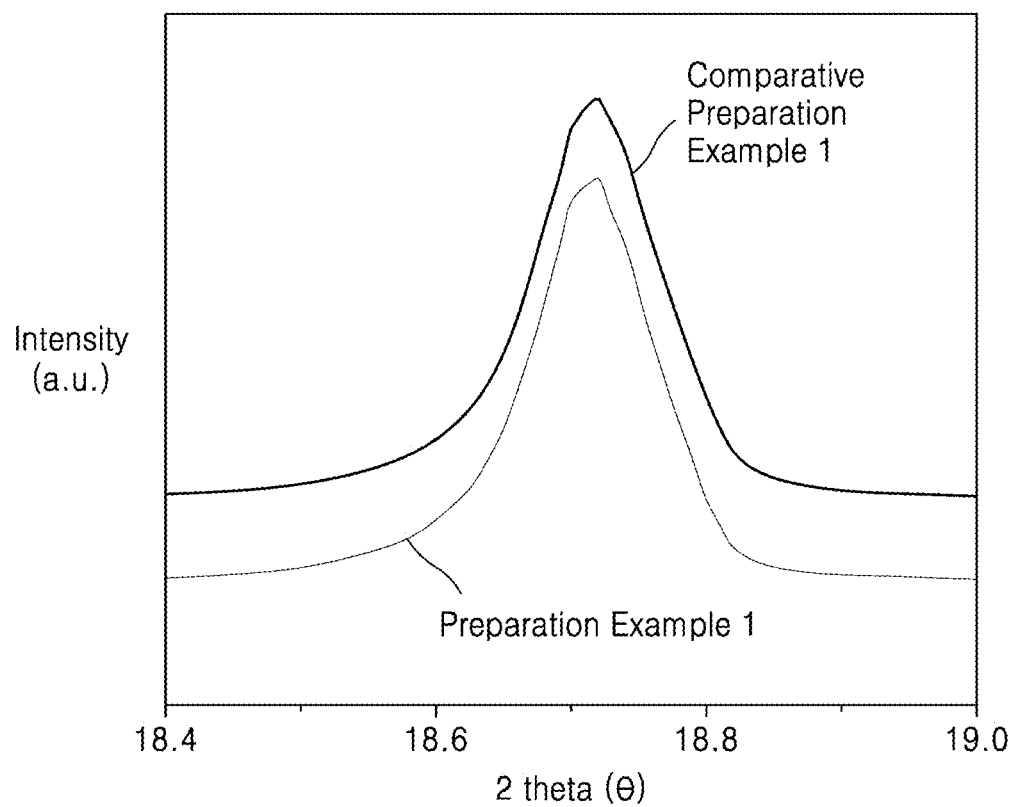
Figure 7C:
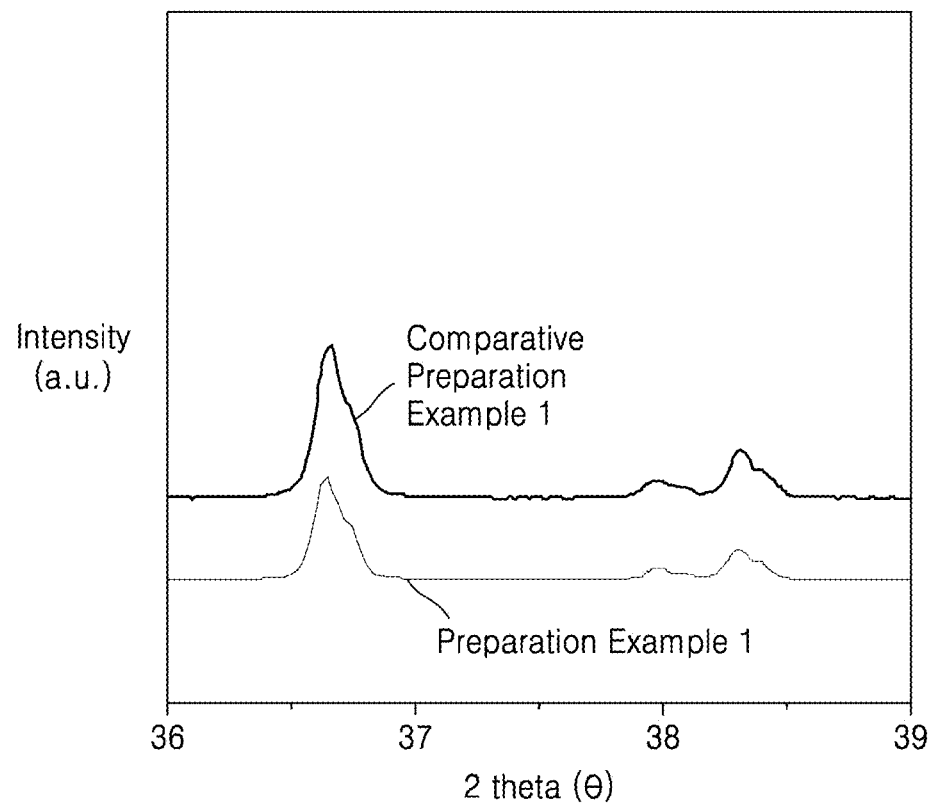
Figure 7D:
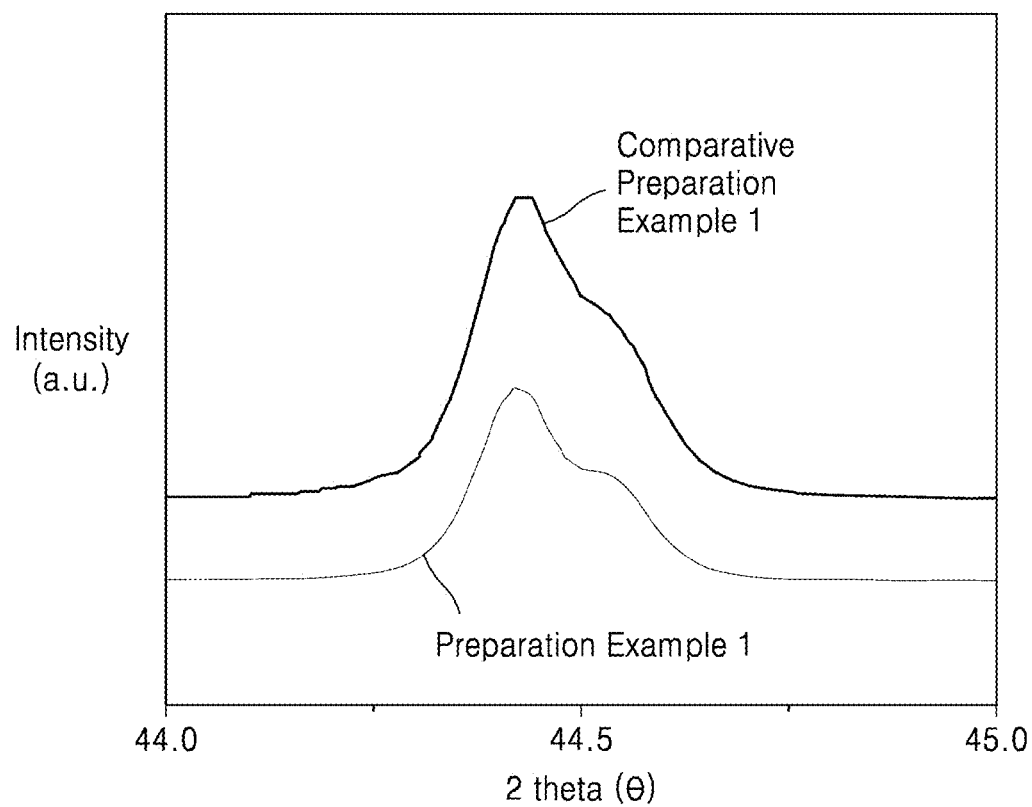
Figure 8A:
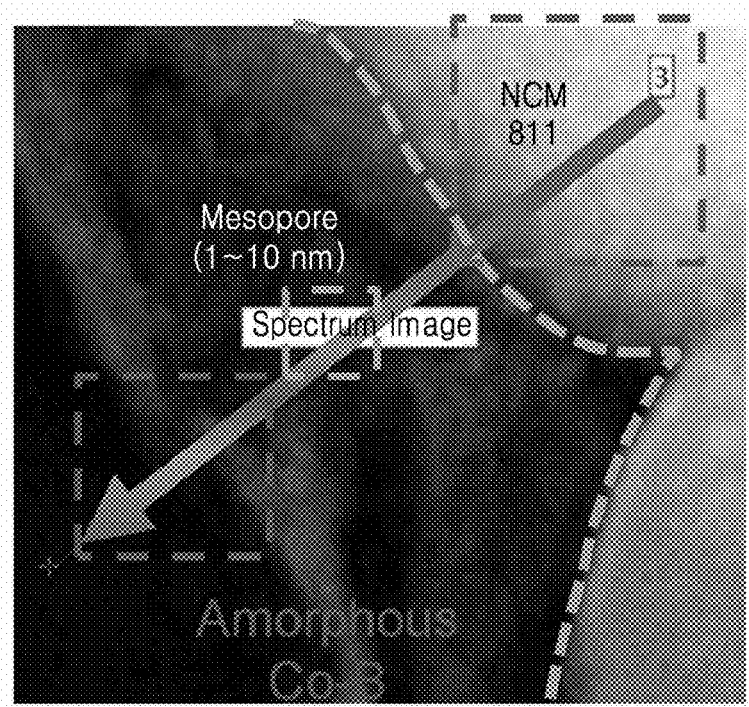
FIGS. 8A to 8D illustrate embodiments of the results of transmission electron microscope-electron energy loss spectroscopy (TEM-EELS) analysis of the lithium secondary battery of Example 1 before evaluating the cycle characteristics thereof.
Figure 8B:
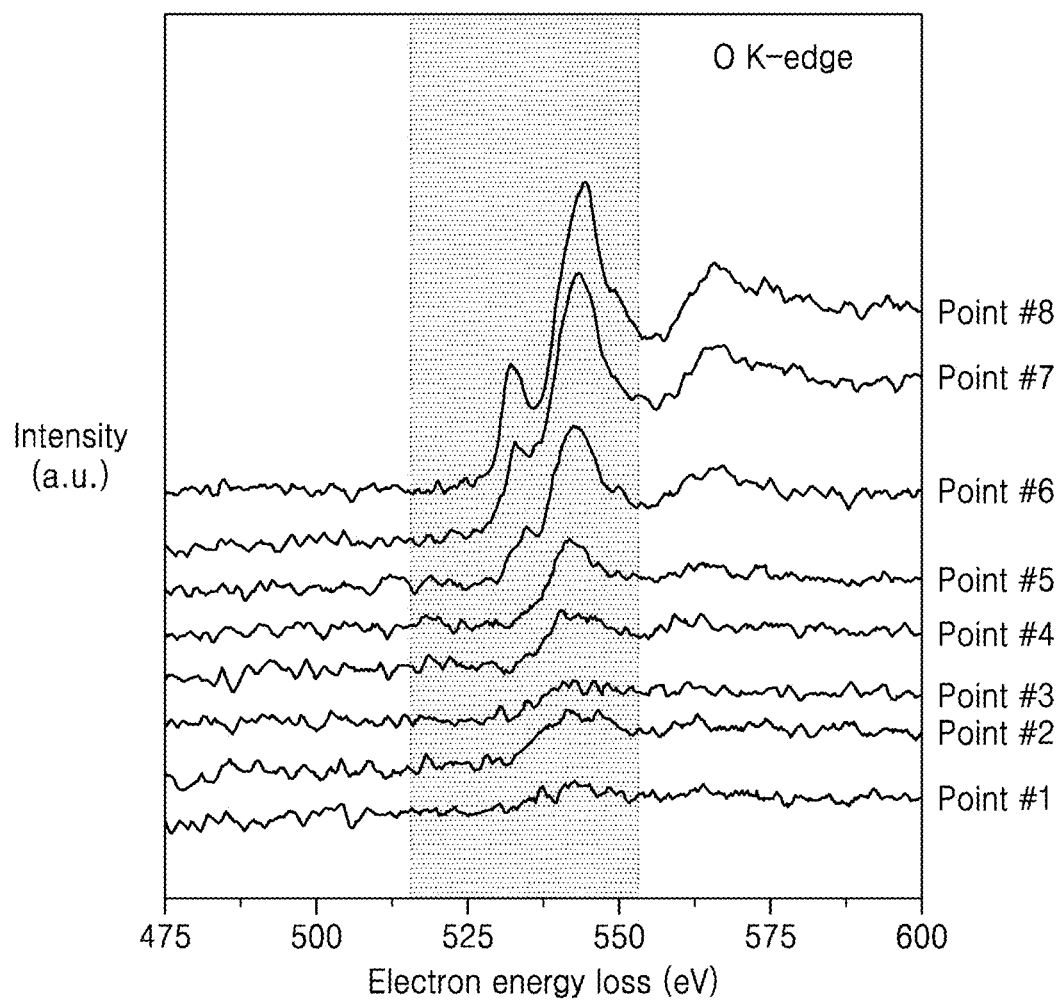
Figure 8C:
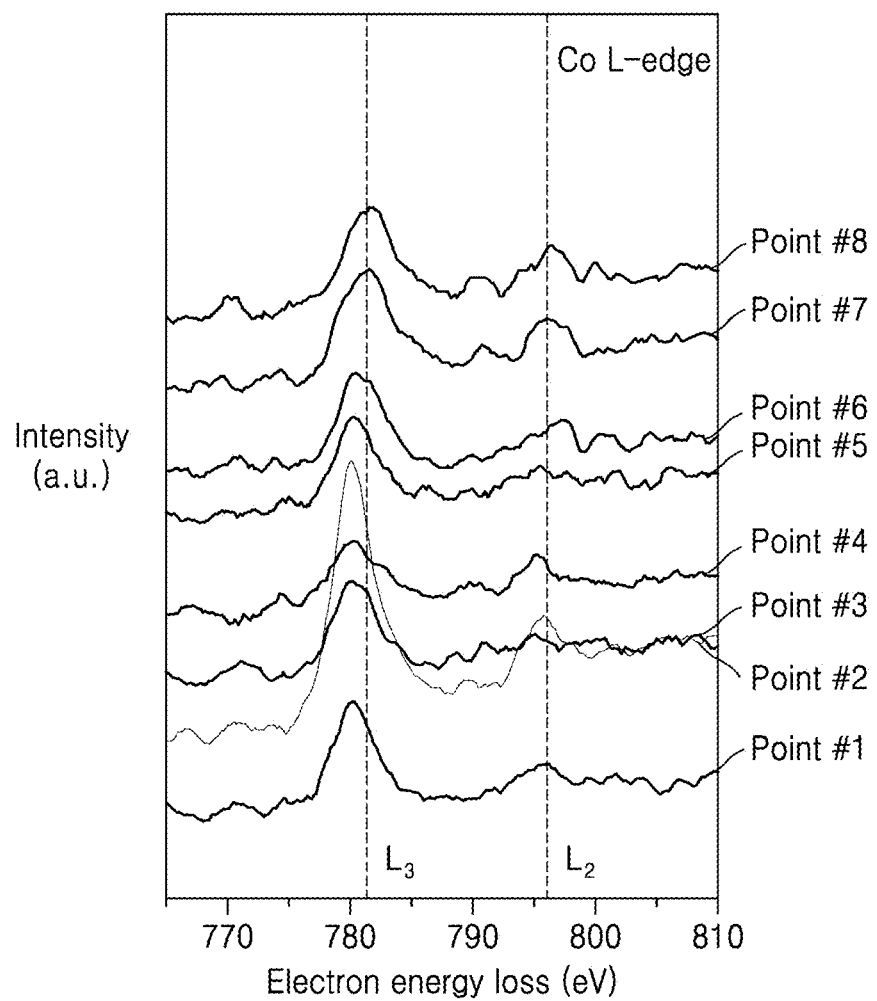
Figure 8D:
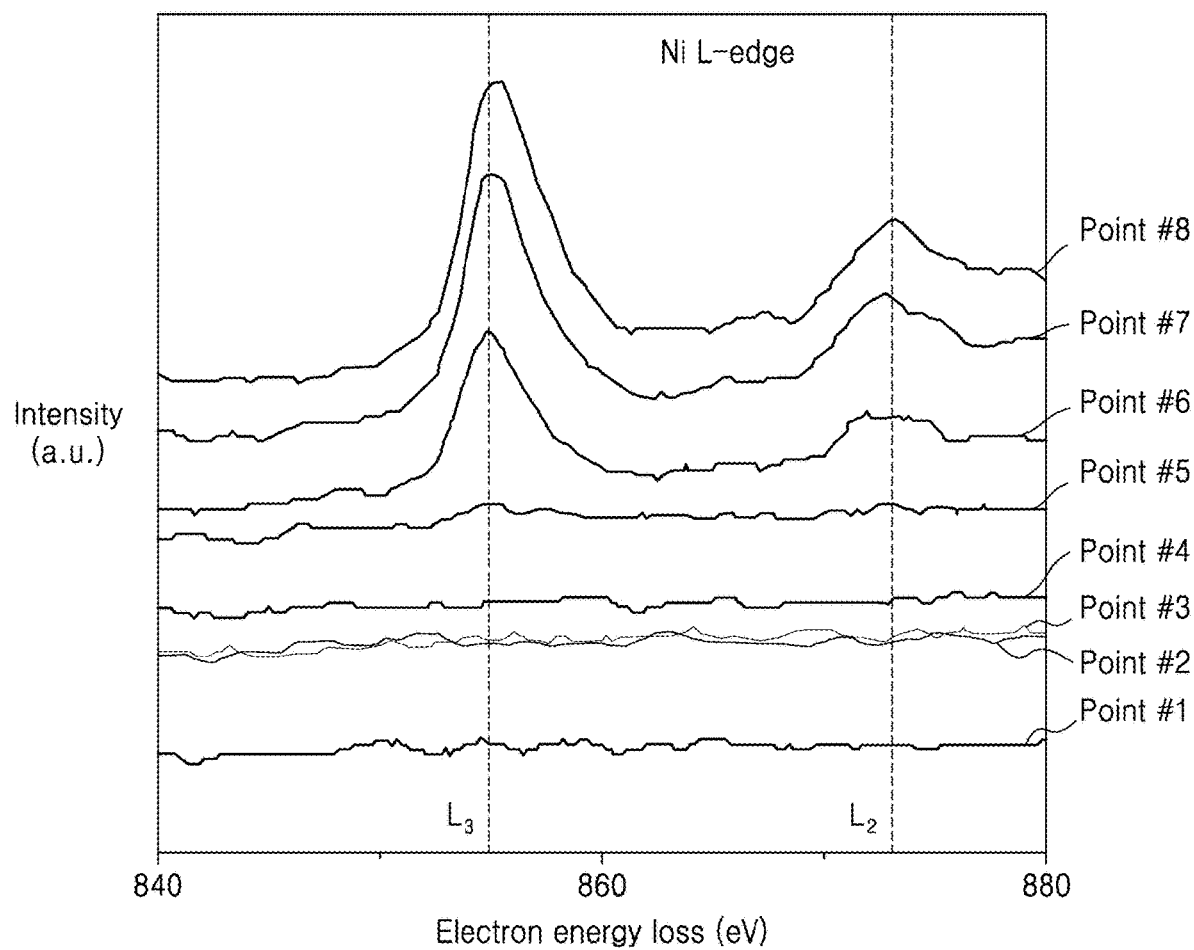
Figure 9A:
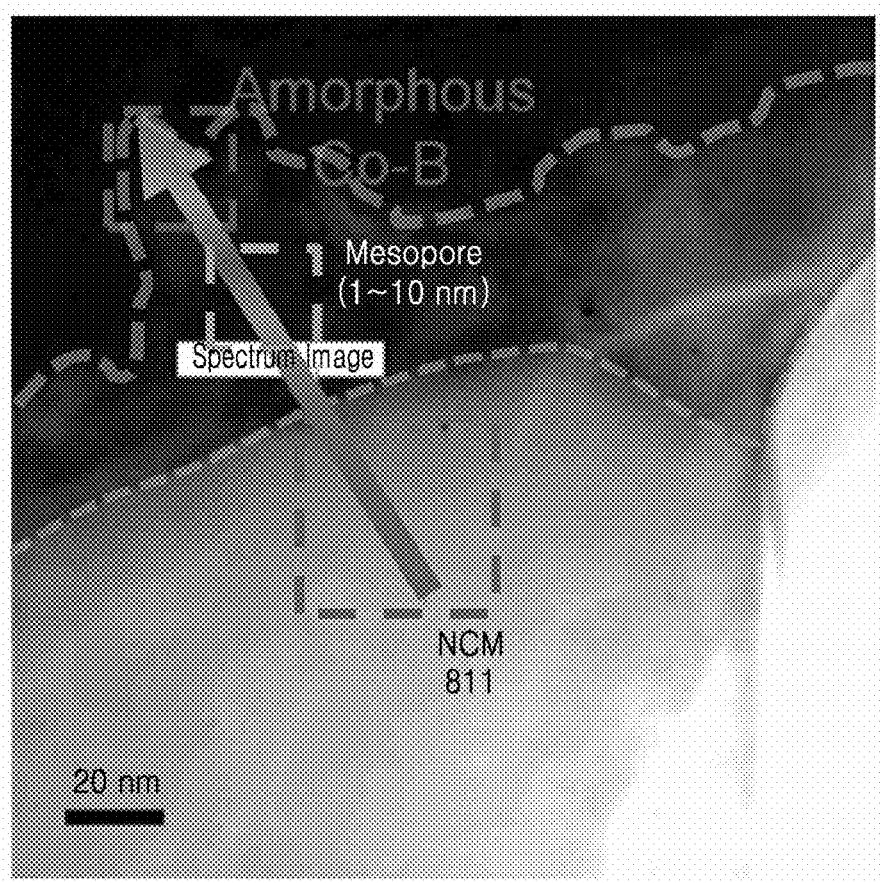
FIGS. 9A to 9D illustrate embodiments of the results of TEM-EELS analysis of the lithium secondary battery of Example 1 after evaluating the cycle characteristics thereof.
Figure 9B:
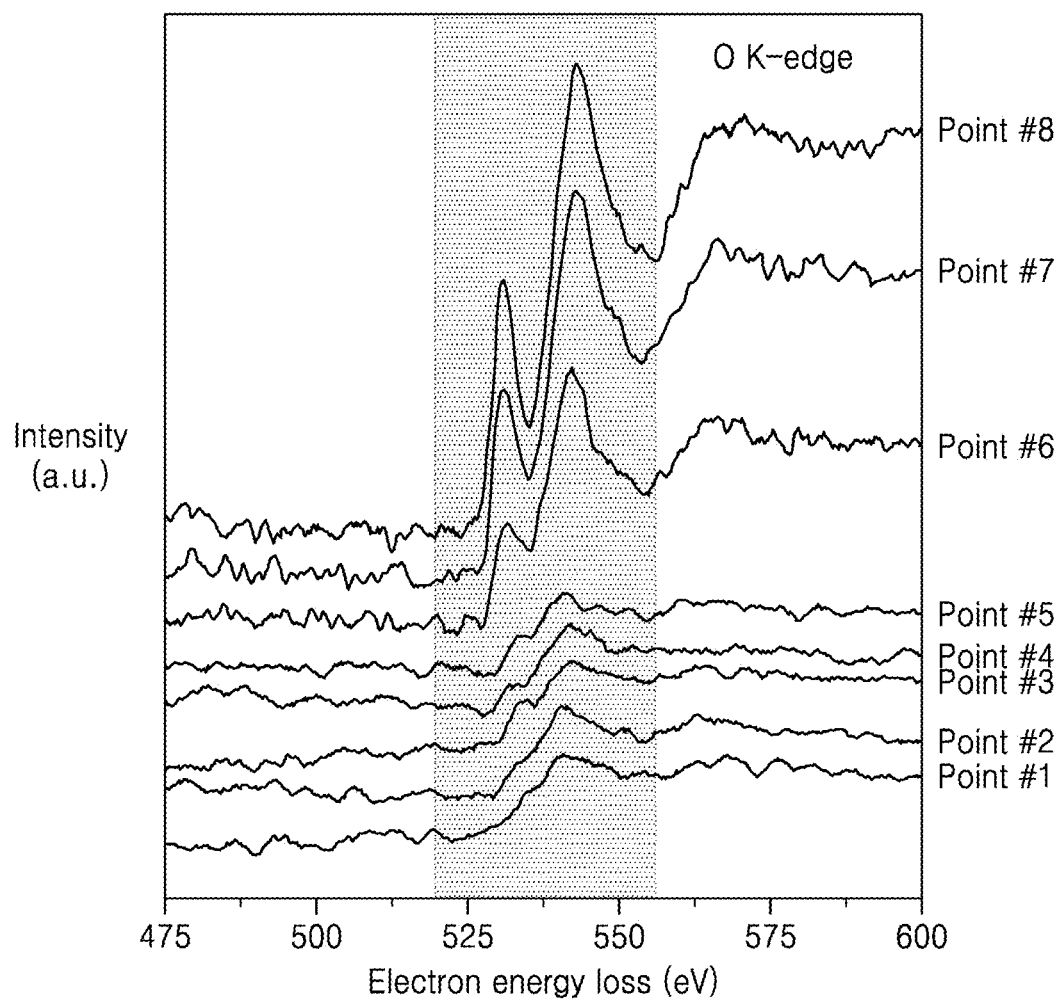
Figure 9C:
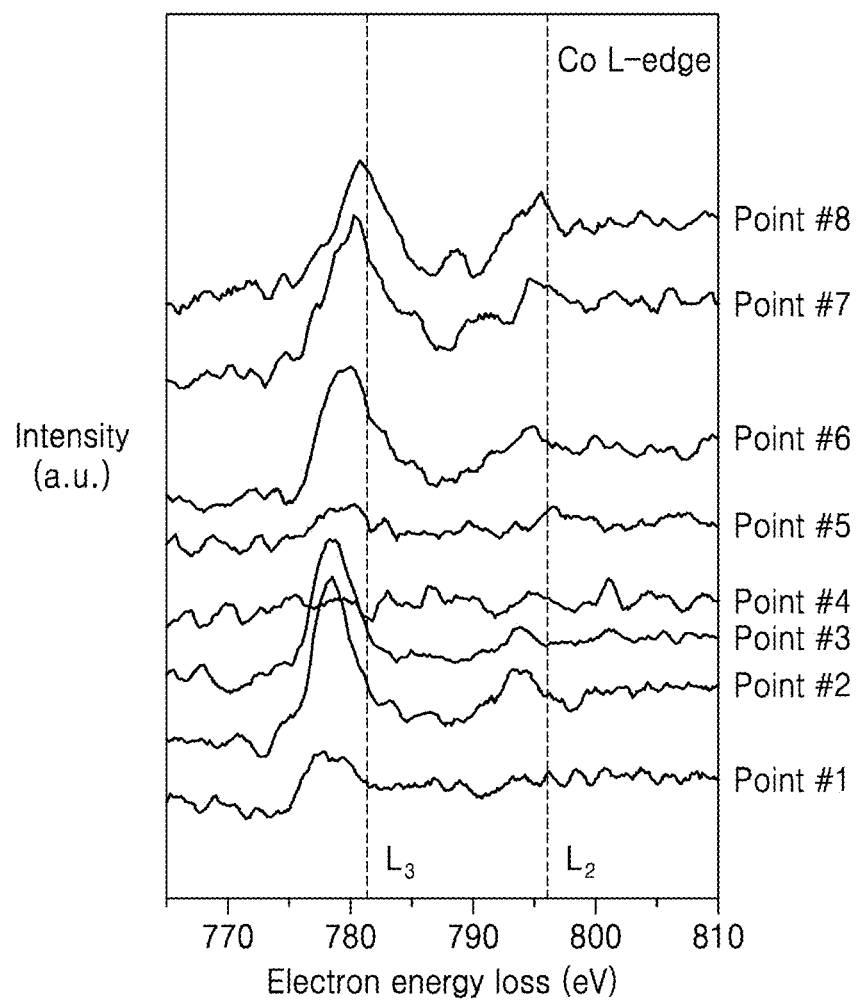
Figure 9D:
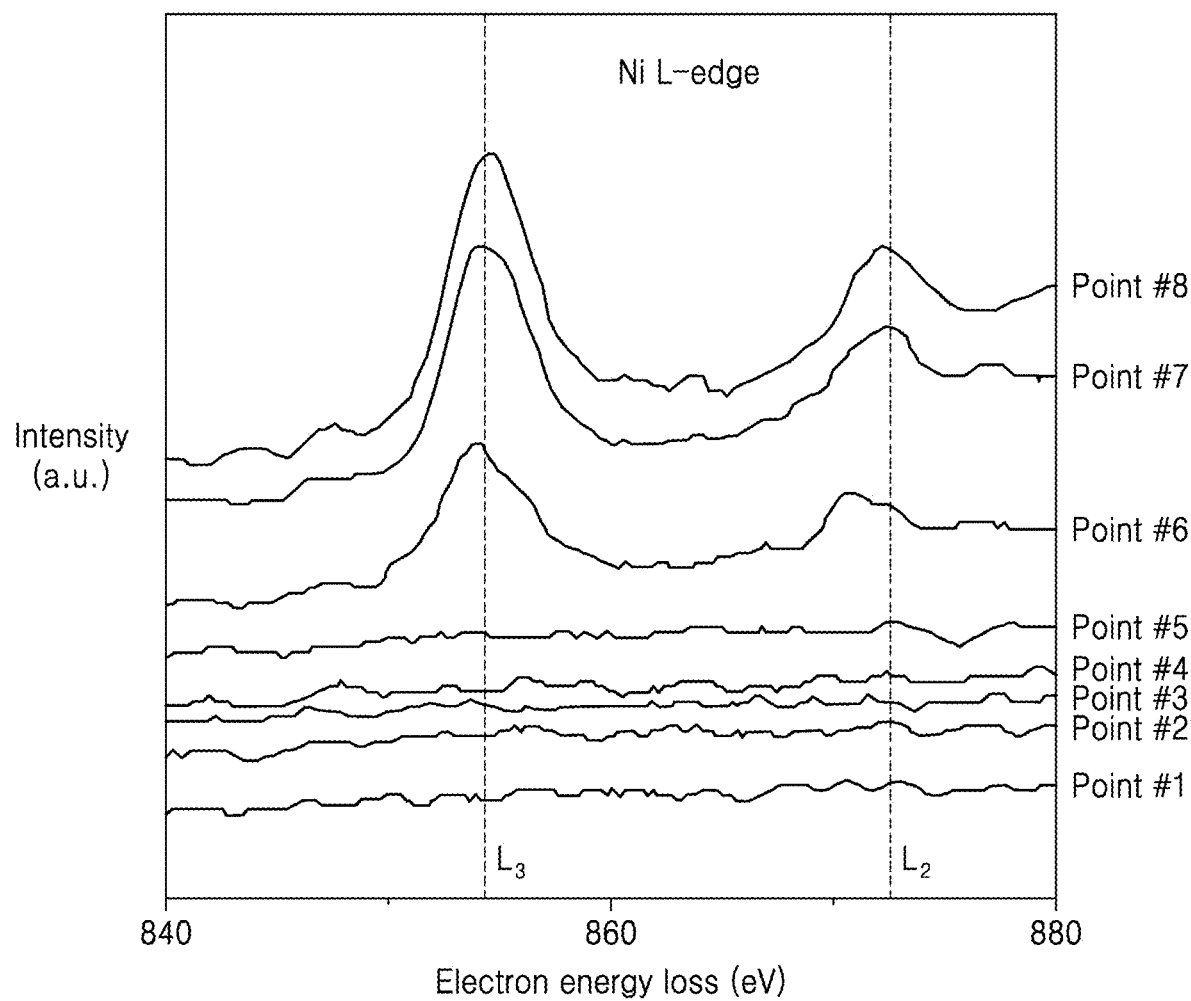

As may be found from the above-described distribution of pore sizes, in the composite positive electrode active material of Preparation Example 1, peaks corresponding to mesopores (average pore diameter: about 10 nm) were formed larger. That is, in the composite positive electrode active material of Preparation Example 1, the amorphous cobalt-boron compound contained in the coating layer fills the inner voids between the secondary particles to reduce macropores, and thus the unit area of the composite positive electrode active material of Preparation Example 1 was greatly increased due to mesopores derived from the cobalt-boron compound itself, as compared with the unit area of the nickel-based active material of Comparative Preparation Example 1. These mesopores can act as a space for rapid lithium diffusion in the coating layer containing the cobalt-boron compound. Evaluation Example 5: X-ray diffraction analysis For the composite positive electrode active material of Preparation Example 1, X-ray diffraction analysis was performed using Smartlab (Rigaku) using Cu Kα radiation (1.54056 Å). The results of the X-ray diffraction analysis are shown in FIGS. 7A to 7D. A part of the area of FIG. 7A is enlarged as shown in of FIGS. 7B to 7D.

As illustrated in FIGS. 7A to 7D, it may be found that the cobalt-boron compound-containing coating layer of the according to Preparation Example 1 does not require a separate heat treatment, the bulk structure of the positive electrode active material does not change during the coating process.

Evaluation Example 6: Transmission Electron Microscopy (TEM)-Electron Energy Loss Spectroscopy (EELS) Analysis In the lithium secondary battery manufactured in Example 1, charge/discharge characteristics were evaluated by a charging/discharging machine (Model: TOYO-3100, manufactured by TOYO Corporation).

In the first charge/discharge cycle, each of the coin cells was charged with a constant current of 0.1 C until a voltage reached 4.40 V, and was then charged with a constant voltage until a current reached 0.05 C. The completely charged coin cell was discharged to a constant current of 0.1 C until the voltage reached 3V after a pause of about 10 minutes. In the second charge/discharge cycle, each of the coin cells was charged with a constant current of 0.2 C until a voltage reached 4.40 V, and was then charged with a constant voltage until a current reached 0.05 C. The completely charged coin cell was discharged to a constant current of 0.2 C until the voltage reached 3V after a pause of about 10 minutes.

In lifetime evaluation, each of the coin cells was charged with a constant current of 1 C until a voltage reached 4.40 V, and was then charged with a constant voltage until a current reached 0.05 C. The completely charged coin cell was discharged to a constant current of 1 C until the voltage reached 3V after a pause of about 10 minutes. These charge/discharge cycles were repeatedly carried out, and the lifetime was evaluated.

In the lithium secondary battery of Example 1, the results of TEM-EELS analyses of the composite positive electrode active material before and after cycle characteristic test are illustrated in FIGS. 8A to 8D and FIGS. 9A to 9D. For the TEM-EELS analyses, Aztec of Oxford Corporation and ARM300F of JEOL Corporation were used, respectively.

In the positive electrode of Example 1, it may be found that before evaluating the cycle characteristics, as illustrated in FIGS. 8A to 8D, a cobalt-boron compound was present in a surface layer, and that after evaluating the cycle characteristics, as illustrated in FIGS. 9A to 9D, cobalt-boron compound remains stable in the surface layer even after high voltage cycles, and the surface composition of the nickel-based positive electrode active material remains stable without being significantly affected.

Evaluation Example 7: X-Ray Photo Electron Spectroscopy Analysis

For the composite positive electrode active material of Preparation Example 1 and the nickel-based active material of Comparative Preparation Example 1, XPS analysis was carried out. XPS analysis was performed using K-alpha x-ray photoelectron spectrometer of Thermo Fisher Corporation (Acceleration voltage: 200 eV-3.0 keV, double focusing hemispherical analyzer used, minimum analysis area 20micro, and X-ray irradiation area: 2 mm×2 mm).

Figure 10A:
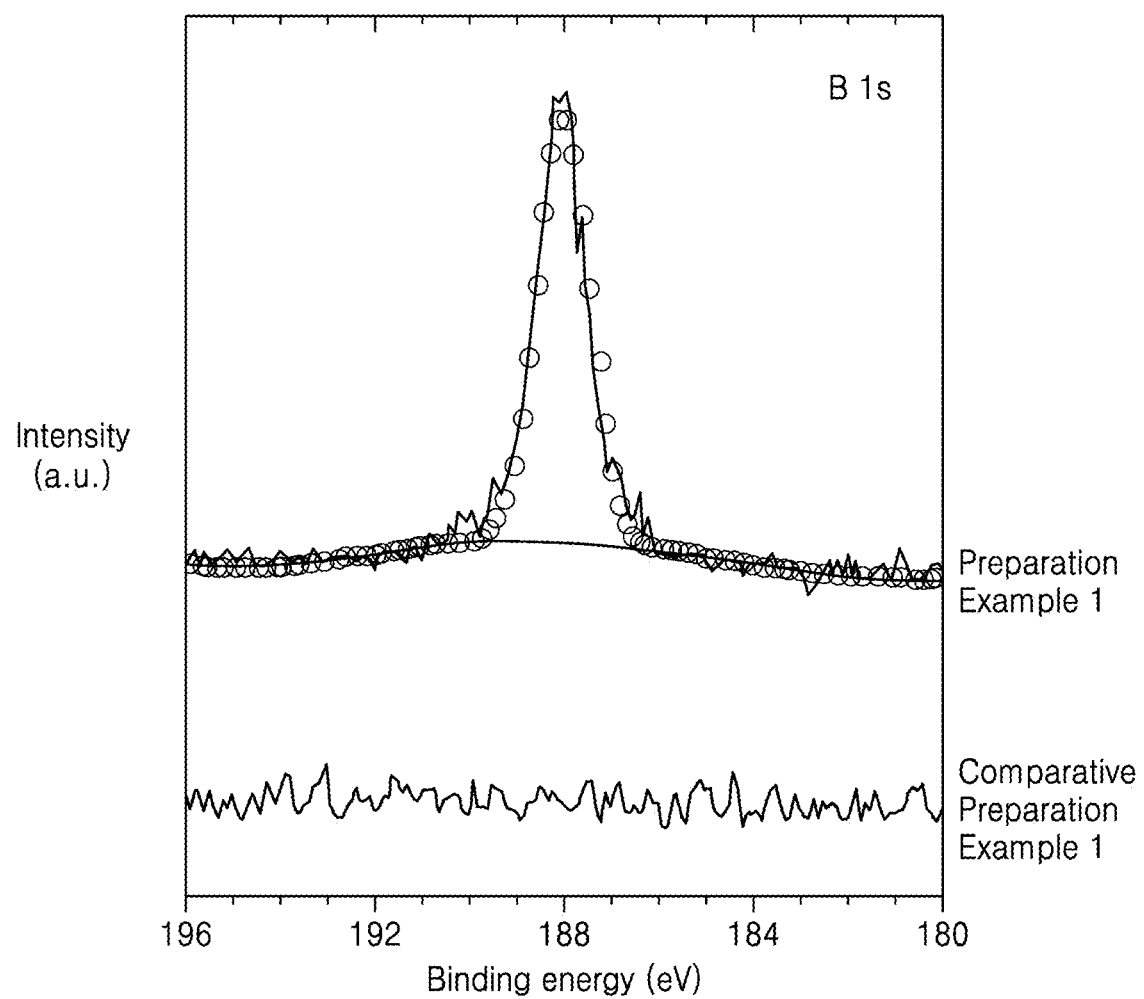
FIGS. 10A and 10B illustrate embodiments of the results of X-ray spectroscopy analysis of the composite positive electrode active material of Preparation Example 1 and the nickel-based active material of Comparative Preparation Example 1, respectively.
Figure 10B:
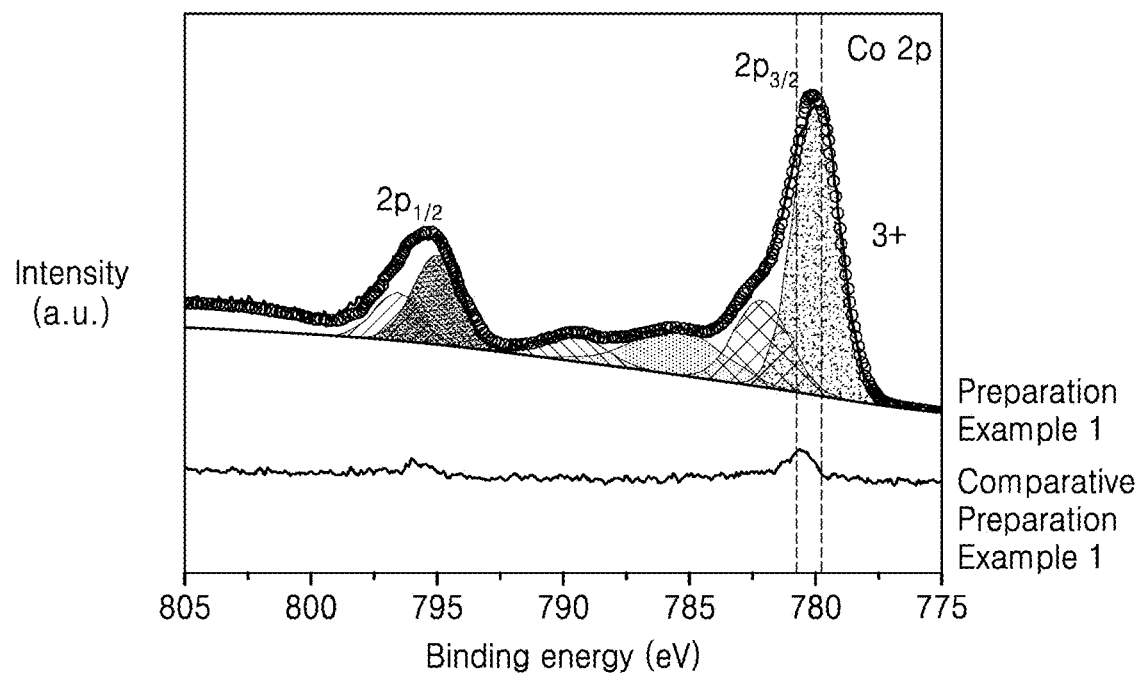

FIGS. 10A and 10B illustrate X-ray spectroscopy analysis results of the composite positive electrode active material of Preparation Example 1 and the positive electrode active material of Comparative Preparation Example 1, respectively.

Referring to these results, it may be found that the constituent elements of the coating layer of the composite positive electrode active material of Preparation Example 1 are boron and cobalt. Further, referring to FIG. 10B, it may be found that, based on the fact that the peak of Co 2p3/2 of XPS is shifted in the direction of low binding energy, cobalt of a general nickel-based active material has an oxidation number of +3, whereas cobalt of the cobalt-boron compound has an oxidation number of about +2 or $+2+\alpha(-1<\alpha<+1)$ lower than that of the general nickel-based active material.

Evaluation Example 8: Cycle Characteristics (1) Room Temperature (25° C.)

In the lithium secondary batteries manufactured in Example 1 and Comparative Examples 1 to 3, charge/discharge characteristics at room temperature (25° C.) were evaluated by a charging/discharging machine (Model: TOYO-3100, manufactured by TOYO Corporation).

In the first charge/discharge cycle, each of the coin cells was charged with a constant current of 0.1 C until a voltage reached 4.40 V, and was then charged with a constant voltage until a current reached 0.05 C. The completely charged coin cell was discharged to a constant current of 0.1 C until the voltage reached 3V after a pause of about 10 minutes. In the second charge/discharge cycle, each of the coin cells was charged with a constant current of 0.5 C until a voltage reached 4.40 V, and was then charged with a constant voltage until a current reached 0.05 C. The completely charged coin cell was discharged to a constant current of 1.0 C until the voltage reached 3V after a pause of about 10 minutes.

In lifetime evaluation, each of the coin cells was charged with a constant current of 1 C until a voltage reached 4.40 V, and was then charged with a constant voltage until a current reached 0.05 C. The completely charged coin cell was discharged to a constant current of 1 C until the voltage reached 3V after a pause of about 10 minutes. These charge/discharge cycles were repeatedly carried out, and the lifetime was evaluated.

Figure 11A:
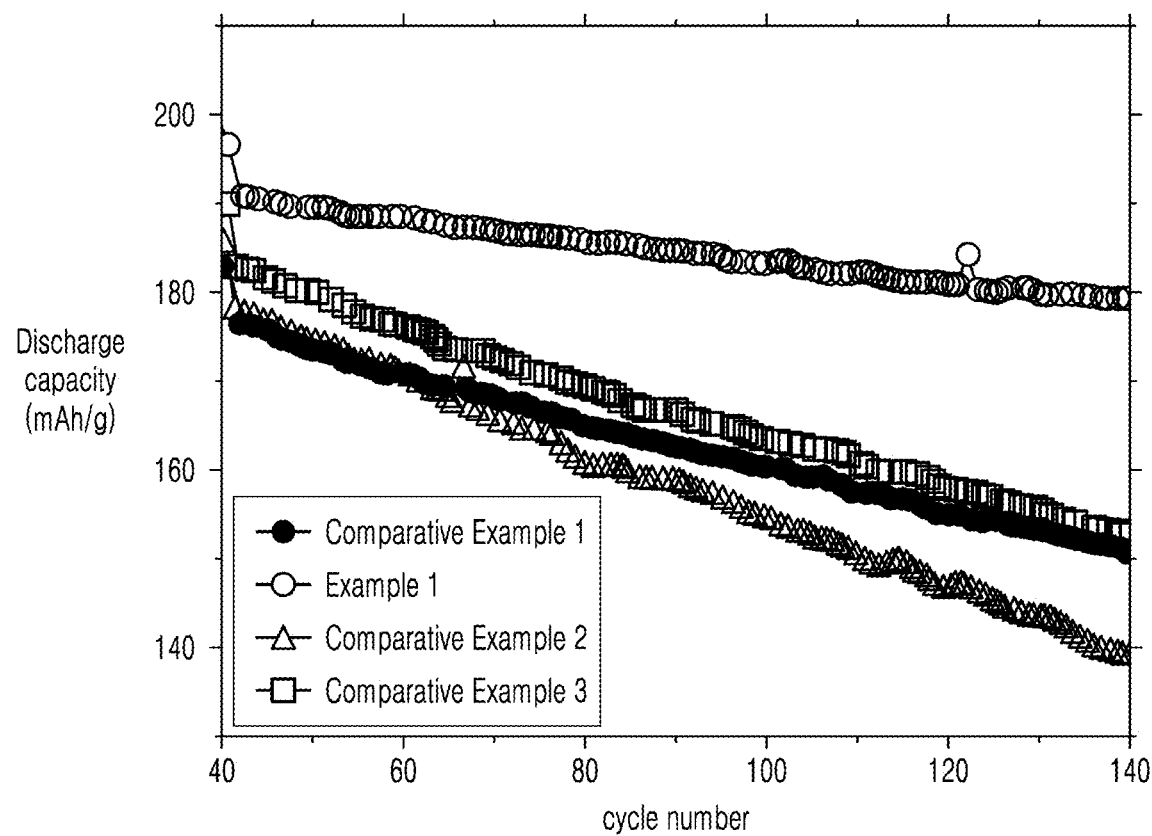
FIG. 11A is a graph illustrating an embodiment of the lifetime characteristics of the lithium secondary batteries manufactured in Example 1 and Comparative Examples 1 to 3 at room temperature (25° C.)

The capacity retention rate (CRR) is calculated by Equation 1 below. The capacity retention rate characteristics were evaluated, and the results thereof are shown in Table 1 below. The capacity retention rate characteristics are shown in FIG. 11A.

Capacity retention rate[%]=[discharge capacity of $100^{th}$ cycle/discharge capacity of $1^{st}$ cycle]×100

TABLE 1

| Class. | Room-temperature capacity retention rate (%) |
| --- | --- |
| Example 1 | 94.2 |
| Comparative Example 1 | 85.2 |
| Comparative Example 2 | 77.5 |
| Comparative Example 3 | 83.5 |

Referring to Table 1 and FIG. 11A, it may be found that the lithium secondary battery manufactured according to Example 1 exhibits an improved capacity retention rate at room temperature (25° C.) as compared with the lithium secondary batteries of Comparative Examples 1 to 3.

(2) High Temperature (45° C.)

The charge/discharge characteristics of the lithium secondary batteries manufactured according to Example 1 and Comparative Examples 1 to 3 were evaluated in the same manner as in the evaluation of the cycle characteristics of the lithium secondary batteries manufactured according to Example 1 and Comparative Examples 1 to 3, except that the evaluation was performed at high temperature (45° C.) instead of at room temperature (25° C.).

Figure 11B:
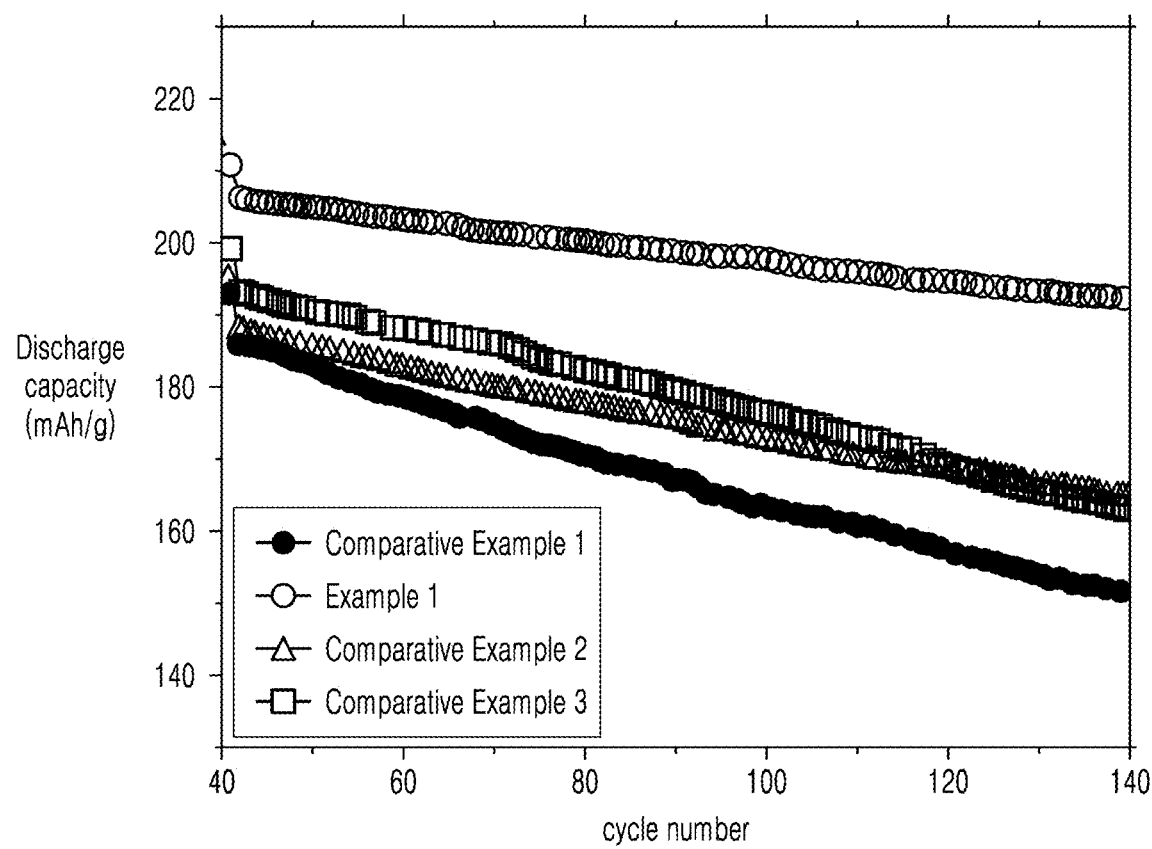
FIG. 11B is a graph illustrating an embodiment of the lifetime characteristics of the lithium secondary batteries manufactured in Example 1 and Comparative Examples 1 to 3 at high temperature (45° C.)

The capacity retention rate (CRR) was calculated by Equation 1, and the results thereof are shown in Table 2 and FIG. 11B.

Capacity retention rate[%]=[discharge capacity of 100$^{th}$ cycle/discharge capacity of 1$^{st}$ cycle]×100    [Equation 1]

TABLE 2

| Class. | Capacity retention rate (%) |
|---|---|
| Example 1 | 94.0 |
| Comparative Example 1 | 85.2 |
| Comparative Example 2 | 87.7 |
| Comparative Example 3 | 83.9 |

Referring to Table 2 and FIG. 11B, it may be found that the lithium secondary battery manufactured according to Example 1 exhibits improved capacity retention rate at high temperature (45° C.) as compared with the lithium secondary batteries of Comparative Examples 1 to 3.

Evaluation Example 9: Room-Temperature Rate Characteristics

In the lithium secondary batteries manufactured in Example 1 and Comparative Examples 1 to 3, in the first cycle, at room temperature (25° C.), each of the lithium secondary batteries was charged to 4.40 V with a constant current at a rate of 0.5 C, and was then discharged to 3 V with a constant current at a rate of 0.5 C. The 1st cycle was repeatedly carried out four times (2nd to 5th cycles).

In the 6th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 1.0 C. The 6th cycle was repeatedly carried out four times (7th to 10th cycles).

In the 11th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 2.0 C. The 11th cycle was repeatedly carried out four times (12th to 15th cycles).

In the 16th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 3.0 C. The 16th cycle was repeatedly carried out four times (17th to 20th cycles).

In the 21st cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 5.0 C. The 21st cycle was repeatedly carried out four times (22th to 25th cycles).

In the 26th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 7.0 C. The 26th cycle was repeatedly carried out four times (27th to 30th cycles).

In the 31st cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 10.0 C. The 31st cycle was repeatedly carried out four times (32th to 35th cycles).

In the 36th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 0.5 C. The 36th cycle was repeatedly carried out four times (37th to 40th cycles).

Figure 12:
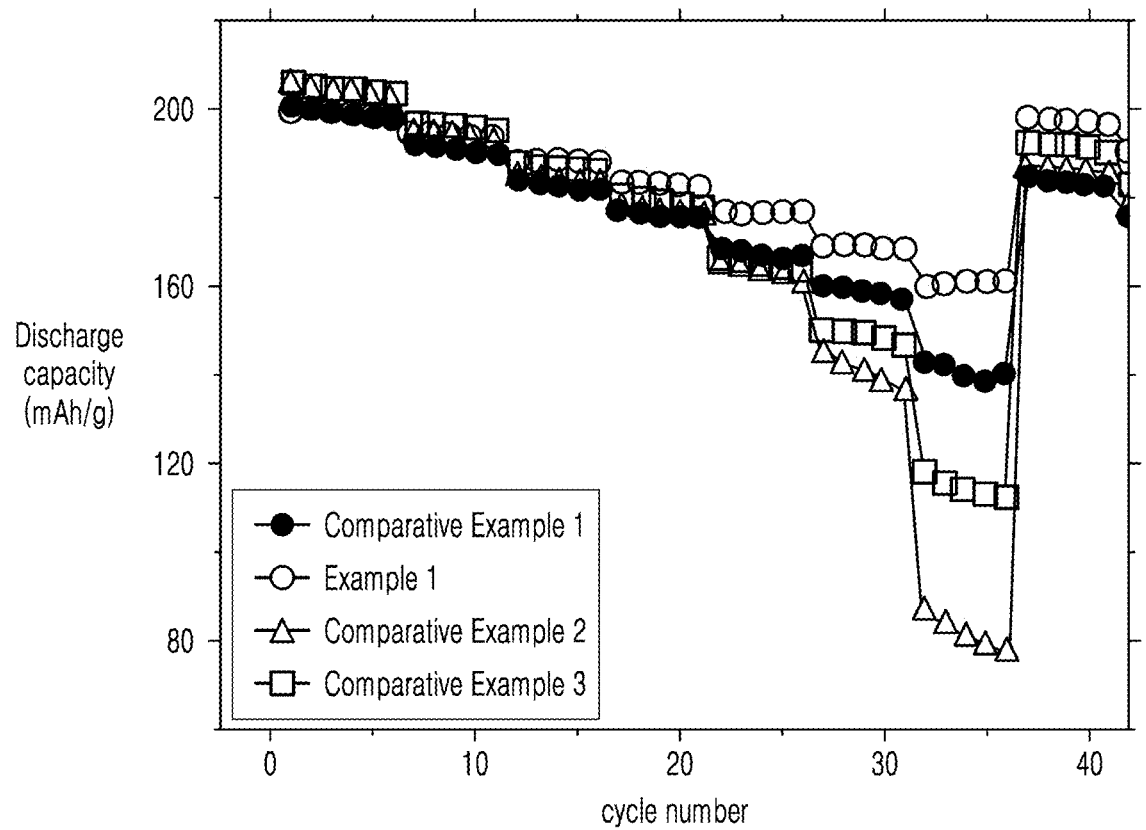
FIG. 12 is a graph illustrating an embodiment of the room-temperature rate characteristics of the lithium secondary batteries manufactured in Example 1 and Comparative Examples 1 to 3.

Some of the above charging and discharging results are shown in FIG. 12 and Table 3.

TABLE 3

| Conditions | Example 1 Discharge capacity (mAh/g) | Comparative Example 1 Discharge capacity (mAh/g) | Comparative Example 2 Discharge capacity (mAh/g) | Comparative Example 3 Discharge capacity (mAh/g) |
|---|---|---|---|---|
| 0.5 C | 200 | 201 | 203 | 202 |
| 1.0 C | 193 | 192 | 192 | 194 |
| 2.0 C | 187 | 184 | 183 | 185 |
| 3.0 C | 182 | 177 | 175 | 177 |
| 5.0 C | 176 | 167 | 160 | 165 |
| 7.0 C | 168 | 160 | 136 | 146 |
| 10.0 C | 160 | 142 | 77 | 112 |
| 0.5 C | 197 | 185 | 185 | 189 |

As shown in Table 3 and FIG. 12, it may be found that the lithium secondary battery of Example 1 has improved room temperature rate characteristics compared to the lithium secondary battery of Comparative Example 1.

Evaluation Example 10: High-Temperature (45° C.) Rate Characteristics

In the lithium secondary batteries manufactured in Example 1 and Comparative Example 1, in the first cycle, at high temperature (45° C.), each of the lithium secondary batteries was charged to 4.40 V with a constant current at a rate of 0.5 C, and was then discharged to 3 V with a constant current at a rate of 0.50. The 1st cycle was repeatedly carried out four times (2nd to 5th cycles).

In the 6th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 1.0 C. The 6th cycle was repeatedly carried out four times (7th to 10th cycles).

In the 11th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 2.0 C. The 11th cycle was repeatedly carried out four times (12th to 15th cycles).

In the 16th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 3.0 C. The 16th cycle was repeatedly carried out four times (17th to 20th cycles).

In the 21st cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 5.0 C. The 21st cycle was repeatedly carried out four times (22nd to 25th cycles).

In the 26th cycle, each of the lithium secondary batteries was charged to 4.40 V with a constant current at a rate of 0.5

C, charged with a constant voltage while maintaining 4.40 V until the current reached 0.05 C, and then discharged to 3 V with a constant current at a rate of 7.0 C. The 26th cycle was repeatedly carried out four times (27th to 30th cycles).

In the 31st cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 10.0 C. The 31st cycle was repeatedly carried out four times (32th to 35th cycles).

In the 36th cycle, each of the lithium secondary batteries was charged to 4.40 V with a constant current at a rate of 0.5 C, charged with a constant voltage while maintaining 4.40 V until the current reached 0.05 C, and then discharged to 3 V with a constant current at a rate of 0.5 C. The 36th cycle was repeatedly carried out four times (37th to 40th cycles).

Figure 13:
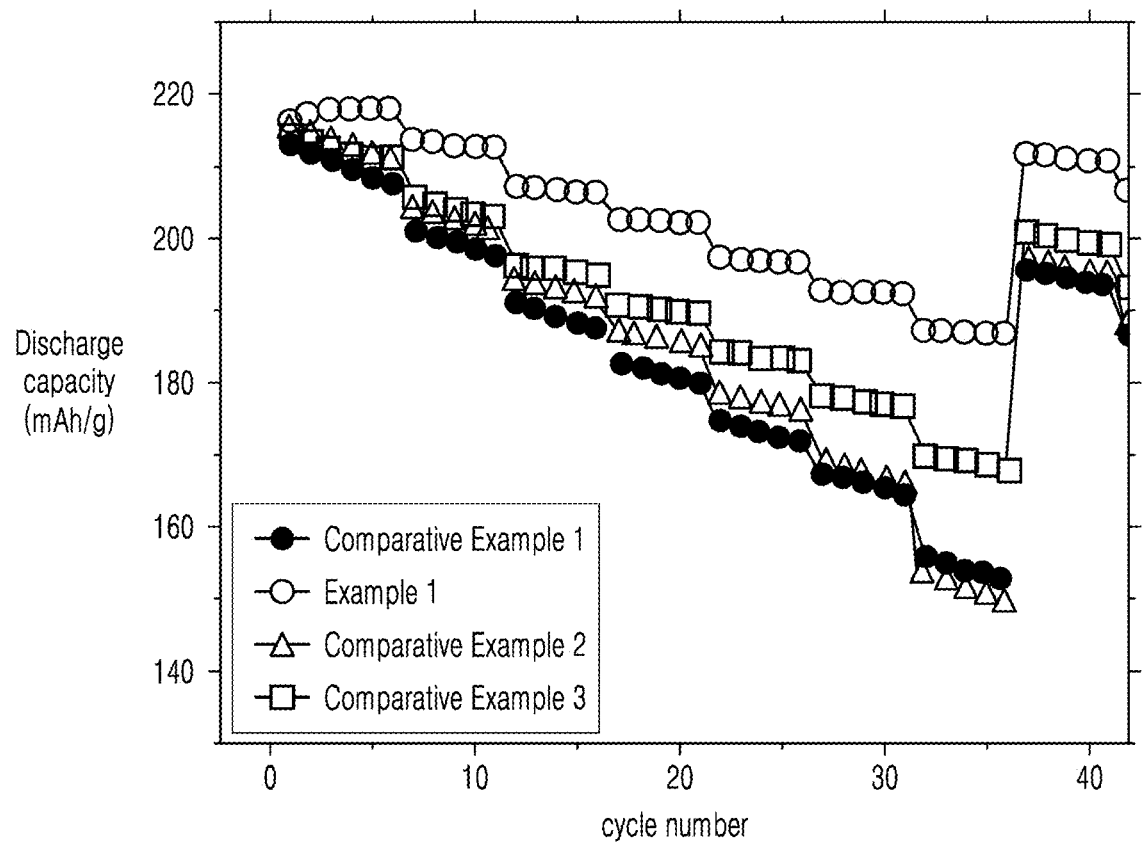
FIG. 13 is a graph illustrating an embodiment of the high-temperature rate characteristics of the lithium secondary batteries manufactured in Example 1 and Comparative Examples 1 to 3.
Figure 14A:
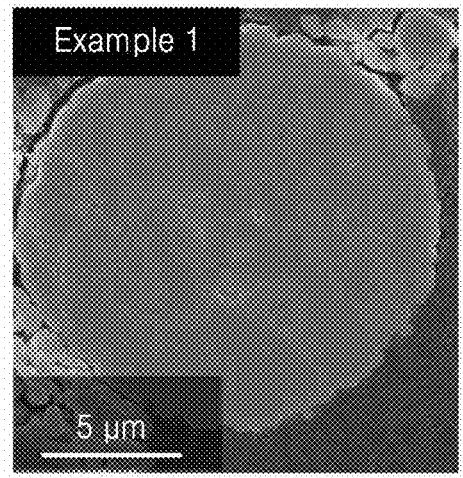
FIGS. 14A to 14D are embodiments of scanning electron microscope (SEM) photographs illustrating the states of the positive electrodes of the lithium secondary batteries of Example 1 and Comparative Examples 1 to 3 after the charge/discharge cycle of Evaluation Example 11, respectively.

Some of the above charging and discharging results are shown in Table 4 and FIGS. 13A and 14A. FIG. 13 illustrates a change in high temperature rate characteristics in the lithium batteries of Example 1 and Comparative Examples 1 to 3.

TABLE 4

| Conditions | Example 1 Discharge capacity (mAh/g) | Comparative Example 1 Discharge capacity (mAh/g) | Comparative Example 2 Discharge capacity (mAh/g) | Comparative Example 3 Discharge capacity (mAh/g) |
| --- | --- | --- | --- | --- |
| 0.5 C | 216 | 213 | 213 | 213 |
| 1.0 C | 213 | 201 | 203 | 204 |
| 2.0 C | 207 | 190 | 192 | 195 |
| 3.0 C | 202 | 182 | 185 | 190 |
| 5.0 C | 197 | 174 | 176 | 183 |
| 7.0 C | 192 | 167 | 167 | 177 |
| 10.0 C | 187 | 156 | 150 | 169 |
| 0.5 C | 210 | 195 | 195 | 199 |
| 1st cycle | 206 | 186 | 187 | 193 |
| 100$^{th}$ cycle | 194 | 150 | 164 | 162 |
| Capacity retention rate (%) | 94.2 | 80.6 | 87.8 | 83.9 |

As shown in Table 4 and FIG. 13, it may be found that the lithium secondary battery of Example 1 has improved high-temperature rate characteristics compared to the lithium secondary batteries of Comparative Examples 1 to 3.

Evaluation Example 11

After the charge/discharge cycles for evaluating high-temperature rate characteristics of the lithium secondary batteries of Example 1 and Comparative Examples 1 to 3 in Evaluation Example 10, states of positive electrodes were evaluated through scanning electron microscope analysis, and the results thereof are illustrated in FIGS. 14A to 14D.

Figure 14B:
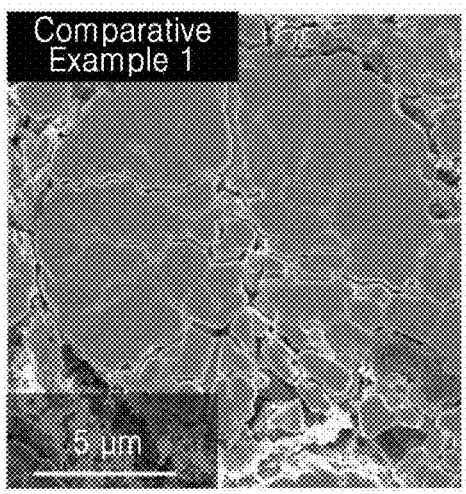
Figure 14C:
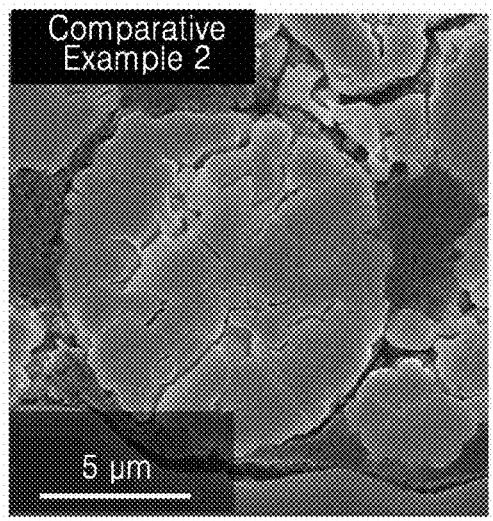
Figure 14D:
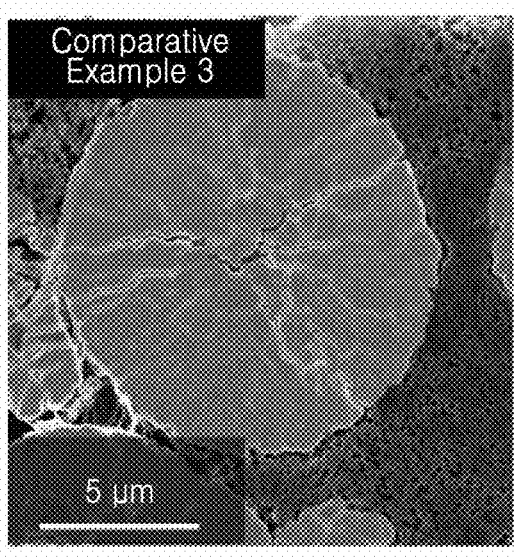

From the above results, it may be found that as shown in FIG. 14A, the positive electrode of Example 1 hardly generates cracks after evaluation of cycle characteristics as compared with the positive electrodes of Comparative Examples 1 to 3 shown in FIGS. 14B to 14D.

When a composite positive electrode active material according to an embodiment is used, it is possible to suppress the formation of micro-cracks occurring at a high voltage and during high-temperature cycles and improve phase stability. When this composite positive electrode active material is used, it is possible to manufacture a lithium secondary battery having improved lifetime and high-rate characteristics.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A composite positive electrode active material for a lithium secondary battery, comprising:
a nickel-based active material; and
a cobalt-boron compound-containing coating layer formed on a surface of the nickel-based active material,
wherein the cobalt-boron compound-containing coating layer comprises an amorphous cobalt-boron compound,
wherein the oxidation number of cobalt in the cobalt-boron compound-containing coating layer is $+2+\alpha$ $(-1<\alpha<1)$.

2. The composite positive electrode active material of claim 1, wherein the cobalt-boron compound-containing coating layer comprises a compound represented by Formula 1:

$$Co_xB_y,$$ [Formula 1]

wherein x is a number of 1 to 3, and y is a number of 0.05 to 3.

3. The composite positive electrode active material of claim 2, wherein in Formula 1, x/y is 0.5 to 2.5.

4. The composite positive electrode active material of claim 1, wherein the nickel-based active material comprises secondary particles, and the secondary particles comprise aggregates of primary particles.

5. The composite positive electrode active material of claim 4, wherein the cobalt-boron compound-containing coating layer is present within voids between the secondary particles.

6. The composite positive electrode active material of claim 1, wherein the content of the cobalt-boron compound is 0.001 parts by weight to 10 parts by weight based on 100 parts by weight of the nickel-based active material.

7. The composite positive electrode active material of claim 1, wherein the nickel-based active material comprises a compound represented by Formula 2:

$$Li_a(Ni_{1-x-y-z}Co_xM_yM'_z)O_{2-\delta}$$ [Formula 2]

wherein M is at least one element selected from Mn and Al, M' is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), except when M and M' are both aluminum (Al), and $0.95 \le a \le 1.3$, $x \le (1-x-y-z)$, $y \le (1-x-y-z)$, $z \le (1-x-y-z)$, $0<x<1$, $0 \le y<1$, $0 \le z<1$, and $1.98 \le 2-\delta \le 2$ are satisfied.

8. The composite positive electrode active material of claim 1, wherein, in an X-ray photoelectron spectroscopy of the composite positive active material:
a first peak corresponding to Co 2p1/2 appears at a binding energy of 793 eV to 796 eV; and
a second peak corresponding to Co 2p3/2 appears at a binding energy of 778 eV to 781 eV,
wherein an intensity ratio of the first peak and the second peak is 1:1.18 to 1:1.26.

9. The composite positive electrode active material of claim 1, wherein the cobalt-boron compound has a nano-flake shape.

10. The composite positive electrode active material of claim 1, wherein the composite positive electrode active material comprises mesopores having an average diameter of 10 nm to 30 nm.

11. The composite positive electrode active material of claim 1, wherein the cobalt-boron compound-containing coating layer has a thickness of 100 nm or less.

12. The composite positive electrode active material of claim 1, wherein the cobalt-boron compound-containing coating layer comprises uniformly-distributed mesopores configured for ion transfer at an interface between the composite positive electrode active material and electrolyte.

13. A lithium secondary battery comprising:
a positive electrode comprising the composite positive electrode active material of claim 1;
a negative electrode; and
an electrolyte interposed between the positive electrode and the negative electrode.

14. The lithium secondary battery of claim 13, the cobalt-boron compound-containing coating layer of the composite positive electrode active material comprises a compound represented by Formula 1:

$$Co_xB_y,$$ [Formula 1]

wherein x is a number of 1 to 3, and y is a number of 0.05 to 3, and wherein the cobalt-boron compound-containing coating layer is present within voids between the secondary particles.

15. A method of preparing a composite positive electrode active material for a lithium secondary battery according to claim 1, the method comprising:
mixing a nickel-based active material, a cobalt precursor, and a first solvent to prepare a mixture;
adding a boron reducing agent and a second solvent to the mixture; and
performing a reaction at room temperature under an inert gas atmosphere.

16. The method of claim 15, wherein the boron reducing agent is sodium borohydride (NaBH$_4$), sodium cyanoborohydride (NaCNBH$_3$), sodium acetoxyborohydride (NaBH$_3$OAc), or a mixture thereof, and wherein the cobalt precursor is cobalt chloride, cobalt nitrate, cobalt sulfate, cobalt oxide, cobalt carbonate, cobalt citrate, cobalt acetate, or a combination thereof.

17. The method of claim 15, wherein the nickel-based active material is a compound represented by Formula 2-1:

$$Li_a(Ni_{1-x-y-z}CO_xMn_yM'_z)O_{2-\delta},$$ [Formula 2-1]

wherein M' is boron (B), magnesium (Mg), calcium (Ca), strontium (Sr), barium (Ba), titanium (Ti), vanadium (V), chromium (Cr), iron (Fe), copper (Cu), Zirconium (Zr), aluminum (Al), or a combination thereof and $0.95 \leq a \leq 1.3$, $x \leq (1-x-y-z)$, $y \leq (1-x-y-z)$, $z \leq (1-x-y-z)$, $0 < x < 1$, $0 \leq y < 1$, $0 \leq z < 1$, and $1.998 \leq 2-\delta \leq 2.000$ are satisfied.

18. The method of claim 15, wherein each of the first solvent and the second solvent is distilled water, ethanol, methanol, isopropanol, butanol, pentanol, or a combination thereof.

* * * * *

UNITED STATES PATENT AND TRADEMARK OFFICE
CERTIFICATE OF CORRECTION

PATENT NO. : 12,107,268 B2
APPLICATION NO. : 17/192711
DATED : October 1, 2024
INVENTOR(S) : Kwanghwan Cho et al.

Page 1 of 1

It is certified that error appears in the above-identified patent and that said Letters Patent is hereby corrected as shown below:

In the Specification

Column 2, Line 53, delete "$1.98 \leq 2-0 \leq 2$" and insert -- $1.98 \leq 2-\delta \leq 2$ --.

Column 7, Line 52 (approx.), delete "$(Ni_{1-x-y-z}CO_xM_y$" and insert -- $(Ni_{1-x-y-z}Co_xM_y$ --.

Column 8, Line 13-14, delete "$1.998 \leq 2-0 \leq 2.000$" and insert -- $1.998 \leq 2-\delta \leq 2.000$ --.

Column 8, Line 23, delete "$(Ni_{1-x-y-z}CO_xM_y$" and insert -- $(Ni_{1-x-y-z}Co_xM_y$ --.

Column 12, Line 54-55, delete "dioxolane, N, N-formamide, N,N" and insert -- dioxolane, N,N-formamide, N,N --.

Column 13, Line 6, delete "LiI, $Li_3NI_2$," and insert -- LiI, $Li_5NI_2$, --.

Column 13, Line 15, delete "$LiAlCl_4$, $CH_3SOBLi$, $CF_3SO_3Li$," and insert -- $LiAlCl_4$, $CH_3SO_3Li$, $CF_3SO_3Li$, --.

Column 14, Line 25, delete "$(Li_{1.01} Ni_{0.8}Co_{0.1}$" and insert -- $(Li_{1.01}Ni_{0.8}Co_{0.1}$ --.

Column 16, Line 26, delete "$(Li_{1.01} Ni_{0.8}Co_{0.1}$" and insert -- $(Li_{1.01}Ni_{0.8}Co_{0.1}$ --.

In the Claims

Column 24, Claim 7, Line 49 (approx.), delete "$(Ni_{1-x-y-z}CO_xM_y$" and insert -- $(Ni_{1-x-y-z}Co_xM_y$ --.

Column 26, Claim 17, Line 19 (approx.), delete "$(Ni_{1-x-y-z}CO_xM_y$" and insert -- $(Ni_{1-x-y-z}Co_xM_y$ --.

Signed and Sealed this
Fourth Day of February, 2025

Coke Morgan Stewart
*Acting Director of the United States Patent and Trademark Office*